US009477460B2

(12) United States Patent
Iriguchi et al.

(10) Patent No.: US 9,477,460 B2
(45) Date of Patent: Oct. 25, 2016

(54) NON-TRANSITORY COMPUTER-READABLE STORAGE MEDIUM FOR SELECTIVE APPLICATION OF UPDATE PROGRAMS DEPENDENT UPON A LOAD OF A VIRTUAL MACHINE AND RELATED APPARATUS AND METHOD

(71) Applicant: FUJITSU LIMITED, Kawasaki (JP)

(72) Inventors: Kota Iriguchi, Kawasaki (JP); Hideo Shimizu, Yokohama (JP); Norihiko Sakamoto, Yokohama (JP); Naoki Akiyama, Kawasaki (JP); Yusuke Tsugita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 700 days.

(21) Appl. No.: 14/016,676

(22) Filed: Sep. 3, 2013

(65) Prior Publication Data

US 2014/0068613 A1    Mar. 6, 2014

(30) Foreign Application Priority Data

Sep. 4, 2012    (JP) ................................ 2012-193871
Aug. 23, 2013    (JP) ................................ 2013-173526

(51) Int. Cl.
| G06F 9/44 | (2006.01) |
| G06F 9/455 | (2006.01) |
| G06F 9/46 | (2006.01) |
| G06F 9/445 | (2006.01) |
| G06F 9/50 | (2006.01) |
| G06F 9/48 | (2006.01) |

(52) U.S. Cl.
CPC . *G06F 8/65* (2013.01); *G06F 8/67* (2013.01); *G06F 9/45545* (2013.01); *G06F 9/4881* (2013.01); *G06F 9/5083* (2013.01)

(58) Field of Classification Search
None
See application file for complete search history.

(56) References Cited

U.S. PATENT DOCUMENTS

| 8,412,822 B1* | 4/2013 | Weinman, Jr. ........ G06F 9/5027 709/201 |
| 8,869,135 B1* | 10/2014 | Fitzgerald ........... G06F 9/45533 717/168 |
| 2007/0271561 A1 | 11/2007 | Winner et al. |
| 2007/0282567 A1* | 12/2007 | Dawson .............. G06F 11/3414 702/186 |
| 2012/0304195 A1* | 11/2012 | Periorellis ................. G06F 9/52 718/106 |
| 2013/0254765 A1* | 9/2013 | Shinohara ........... G06F 9/45533 718/1 |

FOREIGN PATENT DOCUMENTS

| JP | 2009-538469 | 11/2009 |
| JP | 2010-250749 | 11/2010 |

OTHER PUBLICATIONS

Patent Abstracts of Japan, Publication No. 2010-250749, Published Nov. 4, 2010.

* cited by examiner

*Primary Examiner* — Lewis A Bullock, Jr.
*Assistant Examiner* — Mark Gooray
(74) *Attorney, Agent, or Firm* — Staas & Halsey LLP

(57) ABSTRACT

A storage unit stores load information indicating the load of an information processing apparatus by applying each of a plurality of update programs to each virtual machine. An operation unit obtains the load information from the storage unit, and determines, for each virtual machine, an order of applying the plurality update programs to the virtual machine within a predetermined time period on the basis of the load information and an upper load limit allowable for the information processing apparatus.

6 Claims, 21 Drawing Sheets

| VIRTUAL MACHINE MANAGEMENT TABLE | | | |
|---|---|---|---|
| VIRTUAL MACHINE | MAXIMUM RESOURCE ASSIGNMENT | CURRENT RESOURCE ASSIGNMENT | PRIORITY |
| VM1 | 50% | 20% | 1 |
| VM2 | 50% | 10% | 2 |
| VM3 | 50% | 5% | 3 |
| VM4 | 50% | 30% | 4 |

FIG. 5

PATCH MANAGEMENT TABLE

| PATCH NAME | CPU USAGE | MEMORY USAGE | EXECUTION TIME | RESTART FLAG | CPU USAGE AT RESTART | MEMORY USAGE AT RESTART | EXECUTION TIME FOR RESTART | PREREQUISITE PATCH |
|---|---|---|---|---|---|---|---|---|
| P-001 | 30% | 20% | 3 MINUTES | false | — | — | — | — |
| P-002 | 15% | 10% | 2 MINUTES | false | — | — | — | P-001 |
| P-003 | 10% | 10% | 7 MINUTES | true | 40% | 30% | 3 MINUTES | P-001,P-002 |
| P-004 | 15% | 20% | 3 MINUTES | false | — | — | — | — |
| P-005 | 5% | 10% | 7 MINUTES | true | 30% | 30% | 3 MINUTES | — |
| ... | ... | ... | ... | ... | ... | ... | ... | ... |

SCHEDULE TABLE 113

| PATCH NAME | ORDER OF APPLICATION | EXECUTION TIME | ACTUAL EXECUTION TIME | COMPLETION FLAG | DELAY TIME | SCHEDULED START TIME | ACTUAL START TIME | ACTUAL END TIME |
|---|---|---|---|---|---|---|---|---|
| P-001 | 1 | 3 MINUTES | 3 MINUTES | true | 0 MINUTE | 00:00:00 | 00:00:00 | 00:03:00 |
| P-002 | 2 | 2 MINUTES | 3 MINUTES | true | 1 MINUTE | 00:03:00 | 00:03:00 | 00:06:00 |
| P-003 | 3 | 7 MINUTES | 8 MINUTES | true | 2 MINUTES | 00:05:00 | 00:06:00 | 00:14:00 |
| P-004 | 5 | 3 MINUTES | — | false | 2 MINUTES | 00:15:00 | — | — |
| P-005 | 4 | 7 MINUTES | — | false | 2 MINUTES | 00:12:00 | 00:14:00 | — |
| ... | ... | ... | ... | ... | ... | ... | ... | ... |

FIG. 7

SCHEDULE TABLE 113a

| PATCH NAME | ORDER OF APPLICATION | EXECUTION TIME | ACTUAL EXECUTION TIME | COMPLETION FLAG | DELAY TIME | SCHEDULED START TIME | ACTUAL START TIME | ACTUAL END TIME |
|---|---|---|---|---|---|---|---|---|
| P-001 | 2 | 3 MINUTES | 4 MINUTES | true | 1 MINUTE | 00:03:00 | 00:04:00 | 00:08:00 |
| P-002 | 3 | 2 MINUTES | 3 MINUTES | true | 2 MINUTES | 00:06:00 | 00:08:00 | 00:10:00 |
| P-003 | 4 | 7 MINUTES | — | false | 2 MINUTES | 00:08:00 | 00:10:00 | — |
| P-004 | 1 | 3 MINUTES | 3 MINUTES | true | 0 MINUTE | 00:00:00 | 00:00:00 | 00:03:00 |
| P-005 | 5 | 7 MINUTES | — | false | 2 MINUTES | 00:15:00 | — | — |
| ... | ... | ... | ... | ... | ... | ... | ... | ... |

FIG. 8

NON-TRANSITORY COMPUTER-READABLE STORAGE MEDIUM FOR SELECTIVE APPLICATION OF UPDATE PROGRAMS DEPENDENT UPON A LOAD OF A VIRTUAL MACHINE AND RELATED APPARATUS AND METHOD

CROSS-REFERENCE TO RELATED APPLICATIONS

This application is based upon and claims the benefit of priority of the prior Japanese Patent Application No. 2012-193871, filed on Sep. 4, 2012, and the Japanese Patent Application No. 2013-173526, filed on Aug. 23, 2013, the entire contents of which are incorporated herein by reference.

FIELD

The embodiments discussed herein relates to an information processing apparatus, and a scheduling method.

BACKGROUND

In the field of information processing, virtualization technology is employed to allow a plurality of virtual computers (may be called virtual machines or logical hosts) to run on a physical computer (may be called physical machine or physical host). Software such as Operating System (OS) is able to run on each virtual machine. A physical machine using the virtualization technology runs software for managing a plurality of virtual machines. For example, software called a hypervisor may be used to allocate the processing power of a Central Processing Unit (CPU) and the storage area of a Random Access Memory (RAM) as operational resources to a plurality of virtual machines.

Update programs (may be called patches) may be provided for software. For example, the update programs include programs for addressing security problems and programs for adding functions.

For example, there is proposed a system for managing the application of patches to machines. This proposed system determines when to apply the patches. If a patch needs to be applied urgently, then the system determines to apply the patch immediately. If a patch is less urgent and the load on a machine that is to be patched is high, then the system determines to apply the patch a predetermined time later.

See, for example, Japanese National Publication of International Patent Application No. 2009-538469 and Japanese Laid-open Patent Publication No. 2010-250749.

There may be a case where a plurality of update programs is applied to a plurality of virtual machines running on a physical machine. In such a case, the update programs may be applied to the plurality of virtual machines in parallel, thereby completing the application promptly. This would be done because, for example, the application of update programs may be desired to be completed within a time period in which the application affects normal operations very little.

On the other hand, the application of update programs needs to use resources of a physical machine. Therefore, the application of the update programs to a plurality of virtual machines in parallel increases the load on the physical machine. This results in reducing resources available for processes (for example, processes that are performed on virtual machines to which the update programs are not to be applied) other than the process of applying the update programs. This may cause an adverse effect on the other processes, such as a delay. To deal with this problem, it needs to be considered how to efficiently determine a schedule for applying a plurality of update programs while taking effects on other processes into account.

SUMMARY

According to one aspect, there is provided a non-transitory computer-readable storage medium storing a scheduling program to execute a process comprising: obtaining load information indicating load or an information processing apparatus by applying each of a plurality of update programs to each of a plurality of virtual machines that runs on the information processing apparatus; and determining, for each of the plurality of virtual machines, an order of applying the plurality of update programs to said each virtual machine within a predetermined time period based on the obtained load information and an upper load limit allowable for the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a virtual machine management table according to the second embodiment;

FIG. 6 illustrates an example of a patch management table according to the second embodiment;

FIGS. 7 and 8 illustrate examples of a schedule table according to the second embodiment;

DESCRIPTION OF EMBODIMENTS

Figure 1:
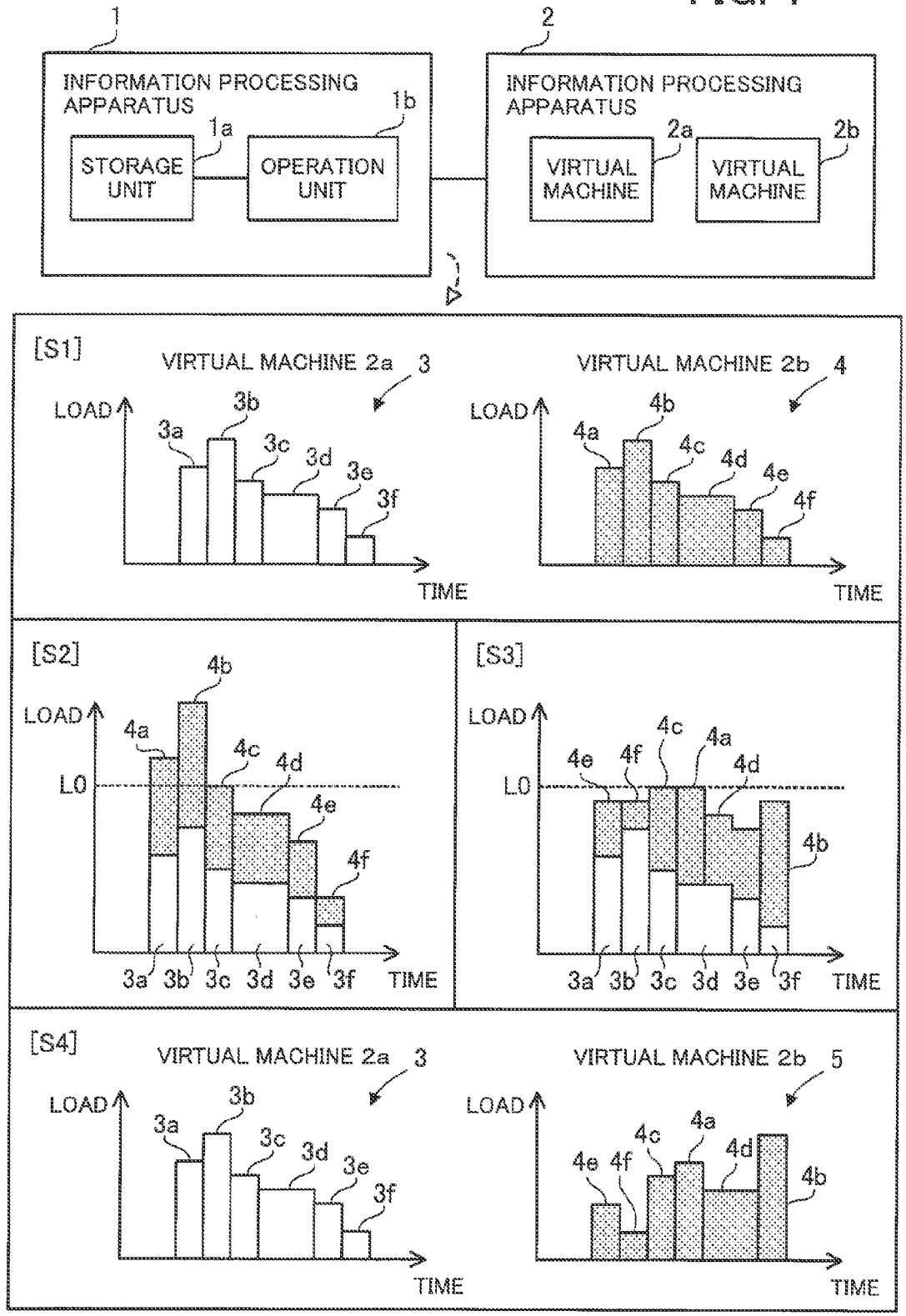
FIG. 1 illustrates an information processing system according to a first embodiment.

Several embodiments will be described below with reference to the accompanying drawings, wherein like reference numerals refer to like elements throughout.

First Embodiment

FIG. 1 illustrates an information processing system according to a first embodiment. The information processing system of the first embodiment includes information processing apparatuses 1 and 2. The information processing apparatus 1 manages the status of applying update programs to a plurality of virtual machines running on the information processing apparatus 2. On the information processing apparatus 2, a plurality of virtual machines including virtual machines 2a and 2b is able to run. For example, a hypervisor running on the information processing apparatus 2 assigns resources such as CPU and memory of the information processing apparatus 2 to the virtual machines 2a and 2b. The virtual machines 2a and 2b use the assigned resources to perform operations.

The information processing apparatus 1 includes a storage unit 1a and an operation unit 1b. The storage unit 1a is, for example, a memory such as a RAM. The operation unit 1b is, for example, a processor such as a CPU. For example, the information processing of the first embodiment is realized by the operation unit 1b executing a program stored in the storage unit 1a.

The storage unit 1a stores load information indicating the load of the information processing apparatus 2 by applying each of a plurality of update programs to each virtual machine 2a and 2b. The storage unit 1a may store information indicating the time to be taken to apply each of the plurality of update programs to the virtual machine 2a and 2b.

For example, for an evaluation purpose, another information processing apparatus that is able to communicate with the information processing apparatus 1 is prepared, and a virtual machine is built on the other information processing apparatus. For example, the information processing apparatus 1 applies each update program to the evaluation virtual machine in order to obtain in advance information indicating how much load of the evaluation information processing apparatus was by applying the update program and how long it took to apply the update program. For example, resources equivalent to those of the information processing apparatus 2 are provided in the evaluation information processing apparatus, and resources equivalent to those of the virtual machines 2a and 2b are assigned to the evaluation virtual machine. By doing so, information on the load and the time taken, obtained using the evaluation information processing apparatus, is usable as information for applying the same patch to each virtual machine 2a and 2b of the information processing apparatus 2.

The operation unit 1b obtains load information indicating the load of the information processing apparatus 2 by applying each of the plurality of update programs, from the storage unit 1a, and calculates the load of the information processing apparatus 2 by applying each of the plurality of update programs to the virtual machine 2a or the virtual machine 2b. The operation unit 1b evaluates, with reference to the information stored in the storage unit 1a, the load of the information processing apparatus 2 by applying at least any one of the plurality of update programs to the virtual machines 2a and 2b in parallel at the same time. The operation unit 1b then determines a schedule (an order of application) for applying the plurality of update programs to the plurality of virtual machines based on a result of comparing the evaluated load and an upper load limit allowable for the information processing apparatus 2. In this connection, the time to start to apply the update programs to the virtual machines 2a and 2b is previously determined. For example, a time period in which the load of the virtual machines 2a and 2b is relative low is used as a time period for applying the update programs. In addition, the upper load limit of the information processing apparatus 2 is an upper load limit that is allowable for the information processing apparatus 2 to apply the update programs.

For example, the plurality of update programs includes updates programs a, b, c, d, e, and f. These update programs are applied in the order of a, b, c, d, e, and f by default. This default order of applying the update programs may be determined according to the release dates and times of the update programs, the priorities of the update programs, etc. For example, the update programs may be applied in chronological order of release date and time. Alternatively, higher priorities are given to update programs of higher importance, and the update programs may be applied in decreasing order of priority. Yet alternatively, higher priorities are given to update programs that place higher load in application, and the update programs may be applied in decreasing order of priority.

For example, the operation unit 1b determines an order of applying the update programs a, b, c, d, e, and f as follows. The operation unit 1b obtains variations in the load on each of the virtual machines 2a and 2b with time, on the basis of the information stored in the storage unit 1a (step S1).

A bar chart 3 represents variations in the load of the information processing apparatus 2 by applying the updates programs to the virtual machine 2a in the order of a, b, c, d, e, and f. A bar chart 4 represents variations in the load of the information processing apparatus 2 by applying the update programs to the virtual machine 2b in the same order of a, b, c, d, e, and f. In these bar charts 3 and 4, horizontal axes represent time, and vertical axes represent load. Bars 3a and 4a represent the load of the information processing apparatus 2 by applying the update program a. The load is the load averaged over the time from start to end of the application (the same applies hereinafter). Alternatively, the highest load detected during the application may be used as the load by the patch application. Bars 3b and 4b represent the load by applying the update program b. Bars 3c and 4c represent the load by applying the update program c. Bars 3d and 4d represent the load by applying the update program d. Bars 3e and 4e represent the load by applying the update program e. Bars 3f and 4f represent the load by applying the update program f.

The operation unit 1b adds the load indicated by the bar chart 3 and the load indicated by the bar chart 4 (step S2). This is equivalent to evaluating the load of the information processing apparatus 2 by applying each of the update programs to the virtual machines 2a and 2b in parallel at the same time.

The operation unit 1b changes the order of applying the update programs a, b, c, d, e, and f to the virtual machines 2a and 2b based on a result of comparing the upper load limit L0 allowable for the information processing apparatus 2 with the evaluated load (step S3). For example, the upper load limit L0 is set so as to secure resources available for the information processing apparatus 2 to perform other processing tasks. For example, the operation unit 1b changes the order of applying the update programs to the virtual machine 2b, based on the order of applying the update programs to the virtual machine 2a. More specifically, the operation unit 1b changes the order of applying the update programs a, b, c, d, e, and f so that the load of the virtual machines 2a and 2b by applying the update programs does not exceed the upper load limit L0 at any time.

As a result, the operation unit 1b determines to apply the update programs to the virtual machine 2a in the order of a, b, c, d, e, and f, and also determines to apply the update programs to the virtual machine 2b in the order of e, f, c, a, d, and b (step S4). The bar chart 5 represents variations in the load of the information processing apparatus 2 by applying the update programs to the virtual machine 2b in the order of e, f, c, a, d, and b.

As described above, in the information processing apparatus 1, the operation unit 1b obtains load information indicating the load of the information processing apparatus 2 by applying each of the update programs a, b, c, d, e, and f to each virtual machine 2a and 2b. Then, the operation unit 1b determines, for each virtual machine 2a and 2b, an order of applying the update programs a, b, c, d, e, and f to the virtual machine 2a and 2b on the basis of the load information and the upper load limit L0 allowable for the information processing apparatus 2.

The above-described approach makes it possible to efficiently determine an order of applying update programs. More specifically, for example, some of the update programs a, b, c, d, e, and f may place relatively high load on the information processing apparatus 2 during application (for example, the bar charts 3 and 4 indicate that a process of applying the update program b places the highest load). Applying such update programs that place high load to the virtual machines 2a and 2b in parallel at the same time increases the load on the information processing apparatus 2. This results in reducing resources available for the information processing apparatus 2 to perform other processing (for example, processing tasks performed by the virtual machines 2a and 2b and the other virtual machines), and thus causes adverse effects, such as a delay, on the other processing.

To deal with this problem, the load of the information processing apparatus 2 by applying a combination of update programs to the virtual machines 2a and 2b in parallel is previously evaluated based on the information on the load of the information processing apparatus 2 by applying each update program. Then, an order of application is determined based on a result of comparing the evaluated load with the upper load limit that is allowable for the information processing apparatus 2 to apply the update programs.

For example, if the evaluated load of update programs in combination is lower than or equal to the upper limit, this combination is allowed to be applied in parallel. More specifically, this situation is that the load of the information processing apparatus 2 by applying the update programs a and e in combination to the virtual machines 2a and 2b, respectively, in parallel is lower than or equal to the upper limit L0 (the load indicated by the stack of the bars 3a and 4e does not reach the upper limit L0). Therefore, it is found allowable to apply the update programs a and e in combination to the virtual machines 2a and 2b, respectively, in parallel. On the other hand, if the evaluated load of update programs in combination exceeds the upper limit, this combination is prohibited from being applied in parallel. More specifically, this situation is that the load of the information processing apparatus 2 by applying the update program a and a to the virtual machines 2a and 2b, respectively, in parallel exceeds the upper limit L0 (the load indicated, by the stack of the bars 3a and 4a exceeds the upper limit L0). Therefore, it is prohibited to apply the update program a and a in combination to the virtual machines 2a and 2b, respectively, in parallel. In this way, it is possible to efficiently determine an order of applying update programs so as to secure prescribed resources in the information processing apparatus 2.

Second Embodiment

Figure 2:
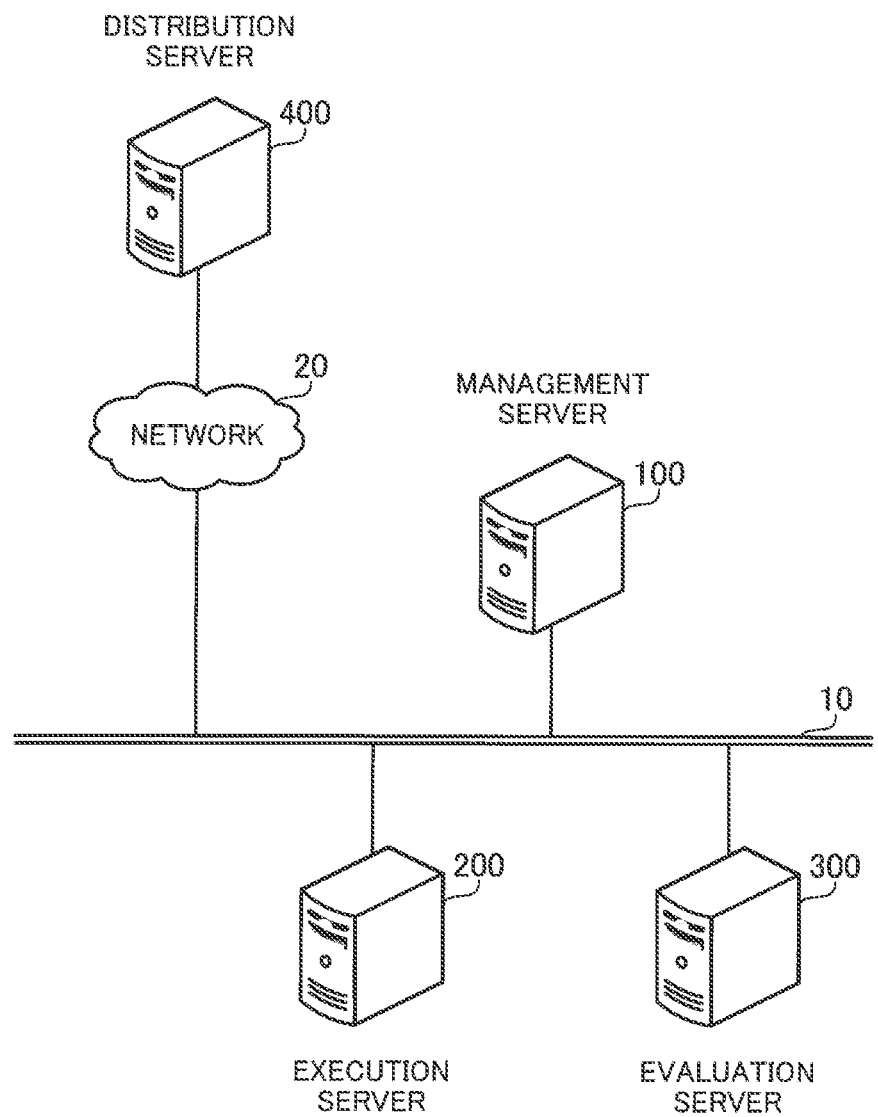
FIG. 2 illustrates an information processing system according to a second embodiment.

FIG. 2 illustrates an information processing system according to a second embodiment. The information processing system of this second embodiment includes a management server 100, execution server 200, evaluation server 300, and distribution server 400. The information processing system of the second embodiment allows a user to use virtual machines running on the execution server 200, for example.

The management server 100, execution server 200, and evaluation server 300 are connected to each other over a network 10. The distribution server 400 is connected to a network 20. The networks 10 and 20 are connected to each other via a router apparatus (not illustrated) that enables communications between the networks. For example, the network 10 is a Local Area Network (LAN), whereas the network 20 is a wide-area network such as the Internet or Wide Area Network (WAN).

The management server 100 is a server computer that manages the application of update programs (hereinafter, these may be referred to as patches) to OS and application software to be executed on virtual machines running on the execution server 200.

The execution server 200 is a server computer where a plurality of virtual machines is able to run. The virtual machines are accessible from client computers (not illustrated) connected to the network 10 (or network 20). The virtual machines perform processes in response to requests from the client computers for user's operations.

The evaluation server 300 is a server computer that obtains information on patches before the patches applied to the virtual machines on the execution server 200. A virtual machine is also built and run on the evaluation server 300. The evaluation server 300 applies patches to the virtual machine in accordance with instructions from the management server 100. The evaluation server 300 obtains information such as the load of applying the patches or the time taken to apply the patches.

Figure 3:
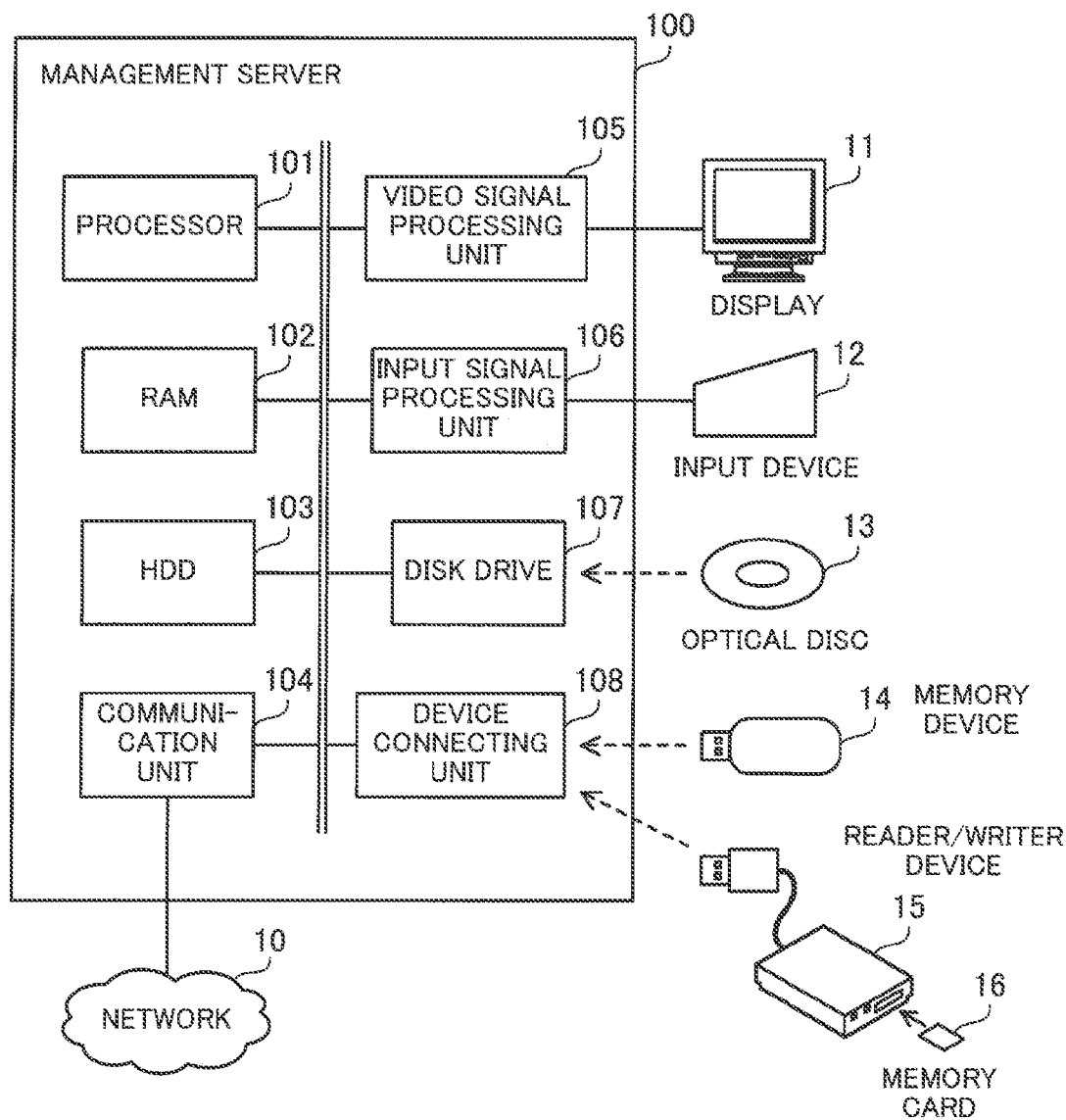
FIG. 3 illustrates an example of a hardware configuration of a management server according to the second embodiment.

FIG. 3 illustrates an example of a hardware configuration of a management server according to the second embodiment. The management server 100 includes a processor 101, RAM 102, Hard Disk Drive (HDD) 103, communication unit 104, video signal processing unit 105, input signal processing unit 106, disk drive 107, and device connecting unit 108. Each unit is connected to a bus of the management server 100. The execution server 200, evaluation server 300, and distribution server 400 may be configured with the same units as the management server 100.

The processor 101 controls the information processing performed by the management server 100. The processor 101 may be a multiprocessor, and is, for example, CPU, Micro Processing Unit (MPU), Digital Signal Processor (DSP), Application Specific Integrated Circuit (ASIC), Field Programmable Gate Array (FPGA), Programmable Logic Device (PLD), or the like. The processor 101 may be implemented using two or more of CPU, MPU, DSP, ASIC, FPGA, and PLD.

The RAM 102 is a main memory device of the management server 100. The RAM 102 temporarily stores at least part of OS programs and application programs to be executed by the processor 101, and also stores various data to be used while the processor 101 operates.

The HDD 103 is a secondary storage device of the management server 100, and is designed to magnetically read and write data on a built-in magnetic disk. The HDD 103 stores the OS programs, application programs, and various dare. A flash memory, Solid State Drive (SSD), or another type of secondary storage device, or a plurality of secondary storage devices may be provided in the management server 100.

The communication unit 104 is an interface for enabling communications with other computers over the network 10. The communication unit 104 may be a wired interface or wireless interface.

The video signal processing unit 105 outputs images to a display 11 connected to the management server 100 in accordance with instructions from the processor 101. A Cathode Ray Tube (CRT) display, liquid crystal display, or another display may be used as the display 11.

The input signal processing unit 106 outputs, to the processor 101, input signals received from an input device 12 connected to the management server 100. A pointing device such as a mouse or touch panel, a keyboard, or the like may be used as the input device 12, for example.

The disk drive 107 is a driving device for reading programs and data from an optical disc 13 with laser light, etc. For example, a Digital Versatile Disc (DVD), DVD-RAM, Compact Disc Read Only Memory (CD-ROM), CD-R (Recordable)/RW (ReWritable), or the like may be used as the optical disc 13. The disk drive 107 stores programs and data read from the optical disc 13 to the RAM 102 or HDD 103 in accordance with instructions from the processor 101, for example.

The device connecting unit 108 is communication interface for connecting peripheral devices to the management server 100. For example, a memory device 14 or reader/writer device 15 may be connected to the device connecting unit 108. The memory device 14 is a recording medium provided with a function for enabling communications with the device connecting unit 108. The reader/writer device 15 performs data read and write on a memory and 16. The memory card 16 is a card recording medium. The device connecting unit 108 stores the programs and data read from the memory device 14 or memory card 16 to the RAM 102 or HDD 103 in accordance with instructions from the processor 101.

Figure 4:
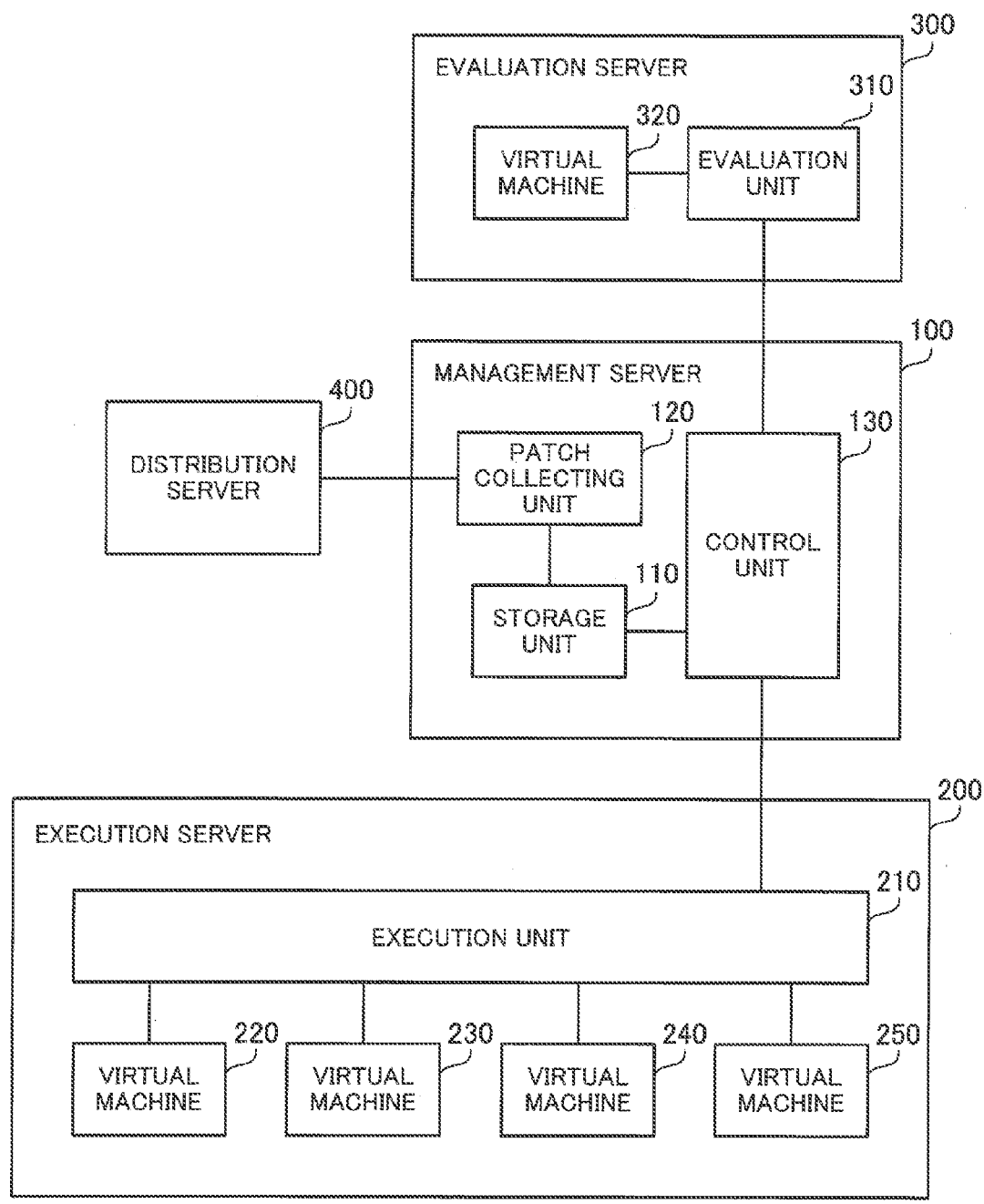
FIG. 4 illustrates an example of a software configuration according to the second embodiment.

FIG. 4 illustrates an example of a software configuration according to the second embodiment. Some or all of the units illustrated in FIG. 4 may be implemented as program modules to be executed by processors provided in the management server 100, execution server 200, and evaluation server 300, or as electronic circuits such as FPGA and ASIC that are provided in the management server 100, execution server 200, and evaluation server 300.

The management server 100 includes a storage unit 110, patch collecting unit 120, and control unit 130.

The storage unit 110 stores patches collected by the patch collecting unit 120. The storage unit 110 also stores information on the patches (such as the load of the execution server 200 by applying the patches, the time to be taken to apply the patches, etc.). The storage unit 110 stores information indicating a schedule for applying the patches to virtual machines. In the storage unit 110, the information indicating the schedule is stored for each virtual machine. The storage unit 110 is implemented using a storage area of the RAM 102 or HDD 103. The storage unit 110 is one example of the storage unit 1*a* of the first embodiment.

The patch collecting unit 120 collects patches distributed from the distribution server 400. For example, when the distribution server 400 starts to distribute a new patch, the patch collecting unit 120 collects and stores the new patch in the storage unit 110. The patch collecting unit 120 may collect patches from a plurality of distribution servers as well as from the distribution server 400.

The control unit 130 causes the evaluation server 300 to previously apply each of patches stored in the storage unit 110 to a virtual machine and obtain information on the patch. The control unit 130 then obtains the information on the patches from the evaluation server 300, and stores the information in the storage unit 110. The control unit 130 generates information indicating a schedule for applying the patches to virtual machines running on the execution server 200, on the basis of the information on the patches stored in the storage unit 110. The control unit 130 instructs the execution server 200 to apply the patches stored in the storage unit 110 to each virtual machine according to the schedule. The control unit 130 obtains information indicating the status of applying the patches to the execution server 200, and stores the information in the storage unit 110.

In this connection, patches are applied to the virtual machines at, for example, predetermined intervals (for example, every day, every week, every month, etc.). The control unit 130 uses the evaluation server 300 to obtain information on the patches before starting to apply the patches, and prepares a schedule for applying the patches.

The execution server 200 includes an execution unit 210 and virtual machines 220, 230, 240, and 250.

The execution unit 210 applies patches to the virtual machines 220, 230, 240, and 250 in accordance with instructions from the control unit 130. The execution unit 210 notifies the control unit 130 of the status of patch application (completion of application for a patch, etc.).

In the following explanation, it is assumed that one patch is applied to each virtual machine at a time. For example, a first patch and a second patch are not allowed to be applied to the virtual machine 220 at the same time (this applies for the other virtual machines). This is to prevent the application of a plurality of patches from causing a conflict such as updating of the same information relating to the OS of the virtual machine 220.

On the other hand, the first patch and the second patch are allowed, to be applied to different virtual machines, for example, to the virtual machine 220 and the virtual machine 230, respectively, in parallel. This is because there is no risk of such a conflict.

The virtual machines 220, 230, 240, and 250 run on the execution server 200. For example, the execution server 200 executes a hypervisor (not illustrated). The hypervisor assigns CPU and RAM resources of the execution server 200 to the virtual machines 220, 230, 240, and 250. As identifiers (ID), Virtual Machine (VM) 1, VM 2, VM 3, and VM 4 are given to the virtual machine 220, 230, 240, and 250, respectively.

Assume now that no patches are applied to the virtual machine 250 while patches are applied to the virtual machines 220, 230, and 240. This is because the load on the virtual machine 250 probably increases due to other processing tasks. The following describes an example of applying patches to the virtual machines 220, 230, and 240 only. Therefore, the virtual machine 250 is treated as an excluded virtual machine that is not to be patched. In this connection, there may be a plurality of excluded virtual machines, like the virtual machine 250.

The evaluation server 300 includes an evaluation unit 310 and virtual machine 320.

The evaluation unit 310 applies patches to the virtual machine 320 in accordance with instructions from the control unit 130. The evaluation unit 310 detects the load of the virtual machine 320 by applying each of the patches and the time taken to apply the patch (this process may be called patch evaluation). The evaluation unit 310 provides the control unit 130 with the obtained information on the patches.

The evaluation unit 310 converts the load on the virtual machine 320 into the load on the evaluation server 300, and informs the control unit 130 of the obtained load. For example, assume that X % of the total CPU resources of the evaluation server 300 is assigned to the virtual machine 320, and the load of applying a patch to the virtual machine 320 is Y % of the resources assigned to the virtual machine 320. In this case, the load on the entire CPU of the evaluation server 300 is calculated as (X×Y×0.01)%. This load may be taken to indicate the resource usage for applying a patch in the execution server 200. The load on RAM may be calculated in the same manner.

In addition, the load obtained by the evaluation unit 310 is an average load over the time from start to end of applying a patch. Alternatively, the evaluation unit 310 may take the highest load detected during application of the patch as the load of applying the patch.

The virtual machine 320 runs on the evaluation server 300. For example, a hypervisor (not illustrated) executed by the evaluation server 300 assigns CPU and RAM resources of the evaluation server 300 to the virtual machine 320.

In this connection, the evaluation server 300 has a processor and RAM which have the same performance level as those of the execution server 200. In addition, resources equivalent to those of the virtual machines 220, 230, and 240 are assignable to the virtual machine 320. Therefore, information on a patch obtained using the virtual machine 320 may be taken to indicate the load of the execution server 200 by applying the patch to the virtual machine 220, 230, and 240 and the time to be taken to apply the patch. For example, as described above, the load of applying a patch to the virtual machine 320 is converted into the load of the evaluation server 300, which is then obtained. Therefore, information on the load obtained with respect to the patch may be considered to indicate the load of the execution server 200 by applying the patch to the virtual machine 220 or to indicate the load of the execution server 200 by applying the patch to the virtual machine 230. This applies to the virtual machine 240. This is because it is considered that the load of a physical CPU, etc. of the execution server 200 by applying a patch to a virtual machine does not vary depending on the amount of resources assigned to the virtual machine.

FIG. 5 illustrates an example of a virtual machine management table according to the second embodiment. A virtual machine management table 111 is stored in the storage unit 110. The virtual machine management table 111 includes the following fields: Virtual Machine, Maximum Resource Assignment, Current Resource Assignment, and Priority.

The Virtual Machine field contains the ID of a virtual machine. The Maximum Resource Assignment field contains information indicating the maximum assignable resources for the virtual machine. The maximum assignable resources are expressed as a percentage in which 100% indicates the total assignable resources in the execution server 200. In this connection, resources may include various types of resources including CPU and memory. In the virtual machine management table 111, information on one of the various types of resources, for example, information on CPU is used. The Current Resource Assignment field contains information on resources currently assigned to the virtual machine.

The Priority field indicates a priority given to the virtual machine. For example, the priority is numerically expressed. A smaller value indicates a higher priority. For example, the priority is set according to the importance of processing tasks to be executed by the virtual machine, etc. For example, a virtual machine that executes processing tasks of higher importance is given a higher priority.

For example, the virtual machine management table 111 includes a record with the Virtual Machine field of "VM1", the Maximum Resource Assignment field of "50%", the Current Resource Assignment field of "20%", and the Priority field of "1". The priority of indicates the highest priority, and the virtual machine 220 is given a higher priority to apply patches than the other virtual machines 230, 240, and 250. This record also indicates that 50% at maximum of all resources (for example, CPU) is assignable to the virtual machine 220, and 20% of the resources is currently assigned thereto.

FIG. 6 illustrates an example of a patch management table according to the second embodiment. The patch management table 112 is generated by the control unit 130, and is stored in the storage unit 110. The patch management table 112 is one example of the load information of the first embodiment. The patch management table 112 includes the following fields: Patch Name, CPU Usage, Memory Usage, Execution Time, Restart Flag, CPU Usage at Restart, Memory Usage at Restart, Execution Time for Restart, and Prerequisite Patch.

The Patch Name field contains information indicating the name of a patch. The CPU Usage field contains information indicating the load, of CPU by applying the patch. The load of the CPU is expressed as a percentage of CPU resources used for applying the patch against the total CPU resources of the evaluation server 300. The Memory Usage field contains information indicating the load of memory by applying the patch. The load of the memory is expressed as a percentage of memory resources used for applying the patch against the total memory resources of the evaluation server 300. The Execution Time field contains information indicating the time to be taken to apply the patch. In this connection, as described earlier, as the evaluation server 300 and be execution server 200 have the same hardware performance level, information on the load, obtained using the evaluation server 300, is usable as information on the load of the execution server 200.

The Restart Flag field contains a flag indicating whether restart is needed or not after the patch is applied. A Restart flag of "true" indicates that restart is needed, and a Restart flag of "false" indicates that restart is not needed. The CPU Usage at Restart field contains information indicating the load of CPU at restart. The Memory Usage at Restart field contains information indicating the load of memory at restart. The Execution Time for Restart field contains information indicating the time to be taken for restart. The Prerequisite Patch field indicates the names of other patches (which may be called "prerequisite patches") that need to be applied before the patch is applied, if there are.

In this connection, the CPU Usage at Restart field, Memory Usage at Restart field, and Execution Time for Restart field contain data if restart is needed after a patch is applied. If restart is not needed after a patch is applied, no data ("- (hyphen)") is set in these fields.

For example, the patch management table 112 includes a record with the Patch Name field of "P-001", the CPU Usage field of "30%", the Memory Usage field of "20%", the Execution Time field of "3 minutes", the Restart Flag field of "false", the CPU Usage at Restart field of "-", the Memory Usage at Restart field of "-", the Execution Time for Restart field of "-", and the Prerequisite Patch field of "-" (no data).

This record indicates that the application of a patch identified by the patch name, "P-001", causes a CPU usage of 30% and a memory usage of 20% in the evaluation server 300, and takes 3 minutes, no restart is needed after the patch is applied, and there is no prerequisite patch.

In addition, for example, the patch management table 112 includes another record with the Patch Name field of "P-003", the CPU Usage field of "10%", the Memory Usage field of "10%", the Execution Time field of "7 minutes", the Restart Flag field of "true", the CPU Usage at Restart field of "40%", the Memory Usage at Restart field of "30%", the Execution Time for Restart field of "3 minutes", and the Prerequisite Patch field of "P-001, P-002".

This record indicates that the application of a patch identified by the patch name, "P-003", causes a CPU usage of 10% and a memory usage of 10% in the evaluation server 300, and takes minutes, and restart is needed after the patch is applied. The record also indicates that the restart causes a CPU usage of 40% and a memory usage of 30%, and takes 3 minutes, and there are prerequisite patches P-001 and P-002. In this connection, the time of 7 minutes taken to apply the patch includes the time of 3 minutes taken for the restart.

FIG. 7 illustrates a first example of a schedule table according to the second embodiment. The schedule table 113 indicates a schedule for applying patches to the virtual machine 220. This schedule table 113 is generated by the control unit 130, and is stored the storage unit 110. The schedule table 113 includes the following fields: Patch Name, Order of Application, Execution Time, Actual Execution Time, Completion Flag, Delay Time, Scheduled Start Time, Actual Start Time, and Actual End Time.

The Patch Name field contains information indicating the name of a patch. The Order of Application field indicates in what order patches are to be applied. For example, the order of application is expressed in ascending numbers. The Execution Time field indicates the time to be taken to apply the patch. The Actual Execution Time field indicates the time actually taken to apply the patch. The Completion Flag field contains a flag indicating whether the application of the patch is complete or not. A flag of "true" indicates that the application of the patch is complete, whereas a flag of "false" indicates that the application of the patch is not complete.

The Delay Time field indicates a cumulative delay time that was incurred from start of a patch applied first to the current patch. A delay time of a patch is calculated by obtaining a difference between the actual execution time and the execution time. The Scheduled Start Time field indicates a scheduled time to start to apply the patch. The Actual Start Time field indicates the time when the patch actually started to be applied. The Actual End Time field indicates the time when the application of the patch actually ended.

In this connection, the Actual Start Time field contains data only for patches which started to be applied. In addition, the Actual Execution. Time and Actual End Time fields contain data only for patches whose application is complete. Further, the Delay Time field is set to "0 minute" by default. When the application of one patch is completed, the delay time caused by this patch is added to each delay time set with respect to the patch and subsequent patches.

For example, the schedule table 113 includes a record with the Patch Name field of "P-001", the Order of Application field of "1", the Execution Time field of "3 minutes", the Actual Execution Time field of "3 minutes", the Completion Flag field of "true", the Delay Time field of "0 minute", the Scheduled Start Time field of "00:00:00", the Actual Start Time field of "00:00:00", and the Actual End Time field of "00:03:00".

This record indicates that a patch identified by the patch name, "P-001", is first applied, 3 minutes are to be taken to apply the patch, the application of this patch is complete, it took 3 minutes to apply the patch, and there was no delay time. The record also indicates that the application of the patch is scheduled to start at 00:00:00, and actually started at 00:00:00 and ended at 00:03:00.

In addition, for example, the schedule table 113 includes another record with the Patch Name field of "P-003", the Order of Application field of "3", the Execution Time field of "7 minutes", the Actual Execution Time field of "8 minutes", the Completion Flag field of "true", the Delay Time field of "2 minutes", the Scheduled Start Time field of "00:05:00", the Actual Start Time field of "00:06:00", and the Actual End Time field of "00:14:00".

This record indicates that a patch identified by the patch name, "P-003", is the third patch applied, 7 minutes are to be taken to apply the patch (including the time to be taken for restart), the application of this patch is complete, it took 8 minutes to apply the patch, and there was a delay time of 2 minutes. The record also indicates that the application of the patch is scheduled to start at 00:05:00, and actually started at 00:06:00 and ended at 00:14:00.

Furthermore, for example, the schedule table 113 has another record with the Patch Name field of "P-005", in which there is data in the Actual Start Time field but there is no data in the Actual Execution Time field or Actual End Time field. This means that a patch identified by the Patch Name, "P-005", is currently applied.

In this connection, in the case where patches are applied every week or every month, date information such as year, month, and date may be included in the Scheduled Start Time, Actual Start Time, and Actual End Time fields.

FIG. 8 illustrates a second example of a schedule table according to the second embodiment. The schedule table 113a indicates a schedule for applying patches to the virtual machine 230. The schedule table 113a is generated by the control unit 130, and is stored in the storage unit 110. The schedule table 113a includes the following fields: Patch Name, Order of Application, Execution Time, Actual Execution Time, Completion Flag, Delay Time, Scheduled Start Time, Actual Start Time, and Actual End Time. Each field contains the same data as that explained with reference to FIG. 7. The storage unit 110 also stores a schedule table having the same data structure as the schedule tables 113 and 113a, for the virtual machine 240. In this connection, a schedule table is not generated for the virtual machine 250 that is not to be patched.

As described above, the control unit 130 generates and stores a schedule for applying patches for each virtual machine 220, 230, and 240 in the storage unit 110. In addition, the control unit 130 manages the status of patch application for each virtual machine with reference to its corresponding schedule table. The following describes processes performed by the management server 100.

Figure 9:
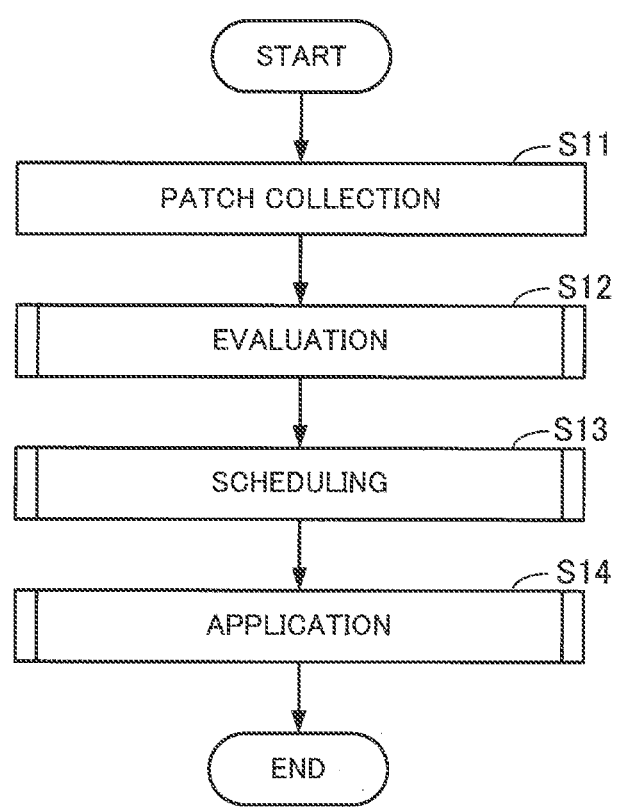
FIG. 9 is a flowchart illustrating a procedure of the second embodiment.

FIG. 9 is a flowchart illustrating a procedure of the second embodiment. This procedure will be described step by step.

(Step S11) The patch collecting unit 120 collects new patches distributed from the distribution server 400, and stores the patches in the storage unit 110.

(Step S12) The control unit 130 sequentially sends the patches stored in the storage unit 110, to the evaluation server 300 to request the evaluation server 300 to evaluate each of the patches. The control unit 130 may make a request for evaluating a new patch when collecting the patch, or a request for evaluating a plurality of new patches every day or every week before these patches are applied (for example, one day before or 12 hours before). In response to the request from the control unit 130, the evaluation unit 310 applies the patches to the virtual machine 320 one by one to evaluate the patches. The evaluation unit 310 obtains information on the patches as a result of the evaluation, and sends the information to the management server 100. The control unit 130 receives the information on the patches, and registers the information in the patch management table 112 stored in the storage unit 110.

(Step S13) The control unit 130 generates a schedule table for each virtual machine with reference to the patch management table 112, and stores the schedule table in the storage unit 110. As described earlier, the patch management table 112 contains load information indicating the load of the execution server 200 by applying each of a plurality of patches to each virtual machine 220, 230, and 240. The control unit 130 determines, for each virtual machine 220, 230, and 240, an order of applying the plurality patches to the virtual machine within a predetermined time period on the basis of the patch management table 112 and an upper load limit allowable for the execution server 200. How to determine the order of application will be described in detail later.

(Step S14) The control unit 130 sequentially sends the patches stored in the storage unit 110 to the execution server 200 with reference to the schedule tables generated for the respective virtual machines, to instruct the execution server 200 to apply the patches to the virtual machines. In response to the instruction from the management server 100, the execution unit 210 applies the patches to the virtual machines. The execution unit 210 informs the management server 100 of the status of the patch application. The control unit 130 may modify the schedule for applying subsequent patches, according to the status of the patch application.

As described above, the management server 100 controls the application of patches to the virtual machines. The following describes each process of the above procedure in detail. First, an evaluation process performed at step S12 will be described.

Figure 10:
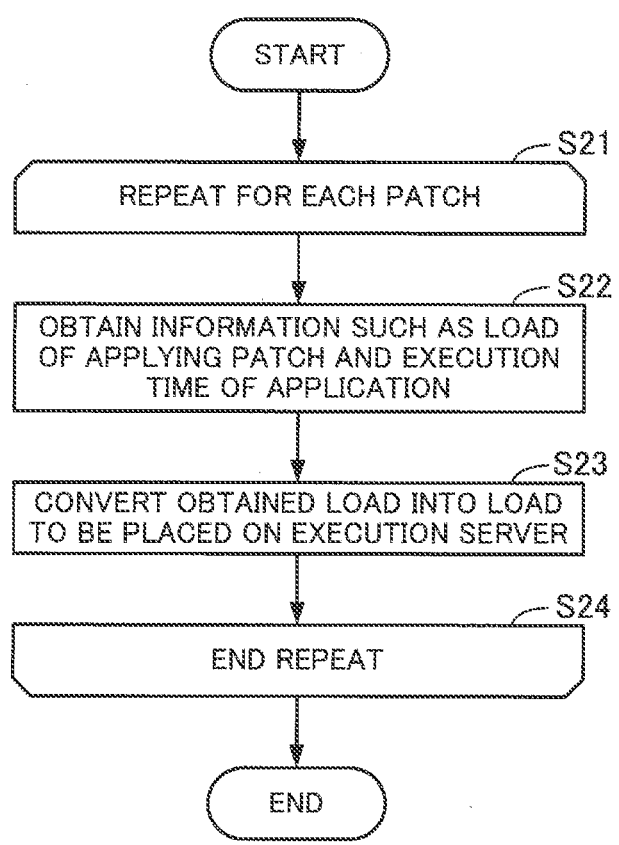
FIG. 10 is a flowchart illustrating an evaluation process according to the second embodiment.

FIG. 10 is a flowchart illustrating an evaluation process according to the second embodiment. This process will be described step by step.

(Step S21) The control unit 130 sequentially sends new patches stored in the storage unit 110 to the evaluation server 300 (for example, in order of collection). The evaluation unit 310 uses the virtual machine 320 to evaluate the received patches. More specifically, the evaluation unit 310 repeats steps S22 and S23 for each patch.

(Step S22) The evaluation unit 310 detects the load of the virtual machine 320 by applying a patch. The load of the virtual machine 320 is expressed as, for example, a percentage of resources used for applying the patch against the total resources (100%) assigned to the virtual machine 320. The evaluation unit 310 obtains the load on the virtual machine 320 with respect to CPU and memory. In addition, the evaluation unit 310 obtains the time taken to apply the patch. The evaluation unit 310 also obtains whether restart is needed or not and whether there is a prerequisite patch or not. For example, whether restart is needed or not is determined based on whether or not the patch restarted the virtual machine after being applied. In addition, for example, information indicating a prerequisite patch may be registered in a received patch, and so whether there is a prerequisite patch or not and the prerequisite patch may be determined by reading out the information.

(Step S23) The evaluation unit 310 converts the load of the virtual machine 320 by applying the patch into the load of the evaluation server 300. As described earlier, assume that X % of the CPU or memory resources of the evaluation server 300 are assigned to the virtual machine 320, and the load of Y % is calculated at step S22 as the load of the CPU or memory of the virtual machine 320. In this case, the load on the evaluation server 300 is calculated as $(X \times Y \times 0.01)\%$. The evaluation unit 310 provides the management server 100 with thus obtained information on the patch. The control unit 130 registers the received information in the patch management table 112 stored in the storage unit 110.

(Step S24) When obtaining information on all of the newly collected patches from the evaluation server 300, the control unit 130 terminates the repetitive process.

As described above, the control unit 130 sends the patches to the evaluation server 300, and obtains the results of evaluating the patches from the evaluation server 300.

In this connection, the control unit 130 may be designed to perform the conversion of step S23. To this end, information on the resources of the evaluation server 300 and information on the resources assigned to the virtual machine 320 are previously provided to the control unit 130. Then, the evaluation unit 310 provides the control unit 130 with the information on the load of the virtual machine 320 by each path. Thereby, the control unit 130 is able to perform the conversion of step S23 based on the received information.

The following describes the scheduling performed at step S13 of FIG. 9.

Figure 11:
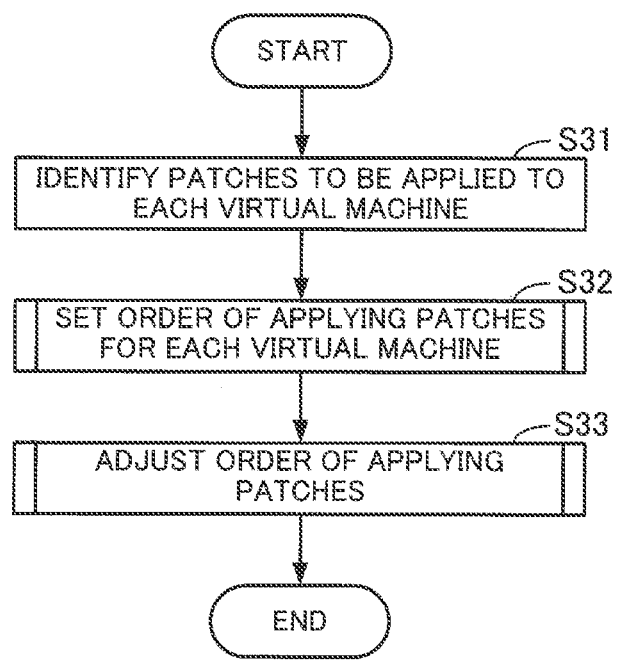
FIG. 11 is a flowchart illustrating a scheduling process according to the second embodiment.

FIG. 11 is a flowchart illustrating a scheduling process according to the second embodiment. This process of FIG. 11 will be described step by step.

(Step S31) The control unit 130 identifies patches to be applied to each virtual machine. More specifically, the control unit 130 identifies patches to be applied to each virtual machine by comparing the OS or applications executed by each virtual machine 220, 230, and 240 with the OS or application that each of newly provided patches is for. The control unit 130 stores information indicating applicable patches for each virtual machine in the storage unit 110.

(Step S32) The control unit 130 sets an order of applying the patches in the schedule table of each virtual machine stored in the storage unit 110. This step will be described in detail later.

(Step S33) The control unit 130 adjusts the order of applying the patches, determined at step S32, taking into account the load of the execution server 200 by the patches. This step will be described in detail later.

As described above, the control unit 130 prepares a schedule for each virtual machine, and registers the schedule in a corresponding schedule table. The following describes the processes performed at steps S32 and S33 in more detail. A process for setting an order of applying patches at step S32 will be first described.

Figure 12:
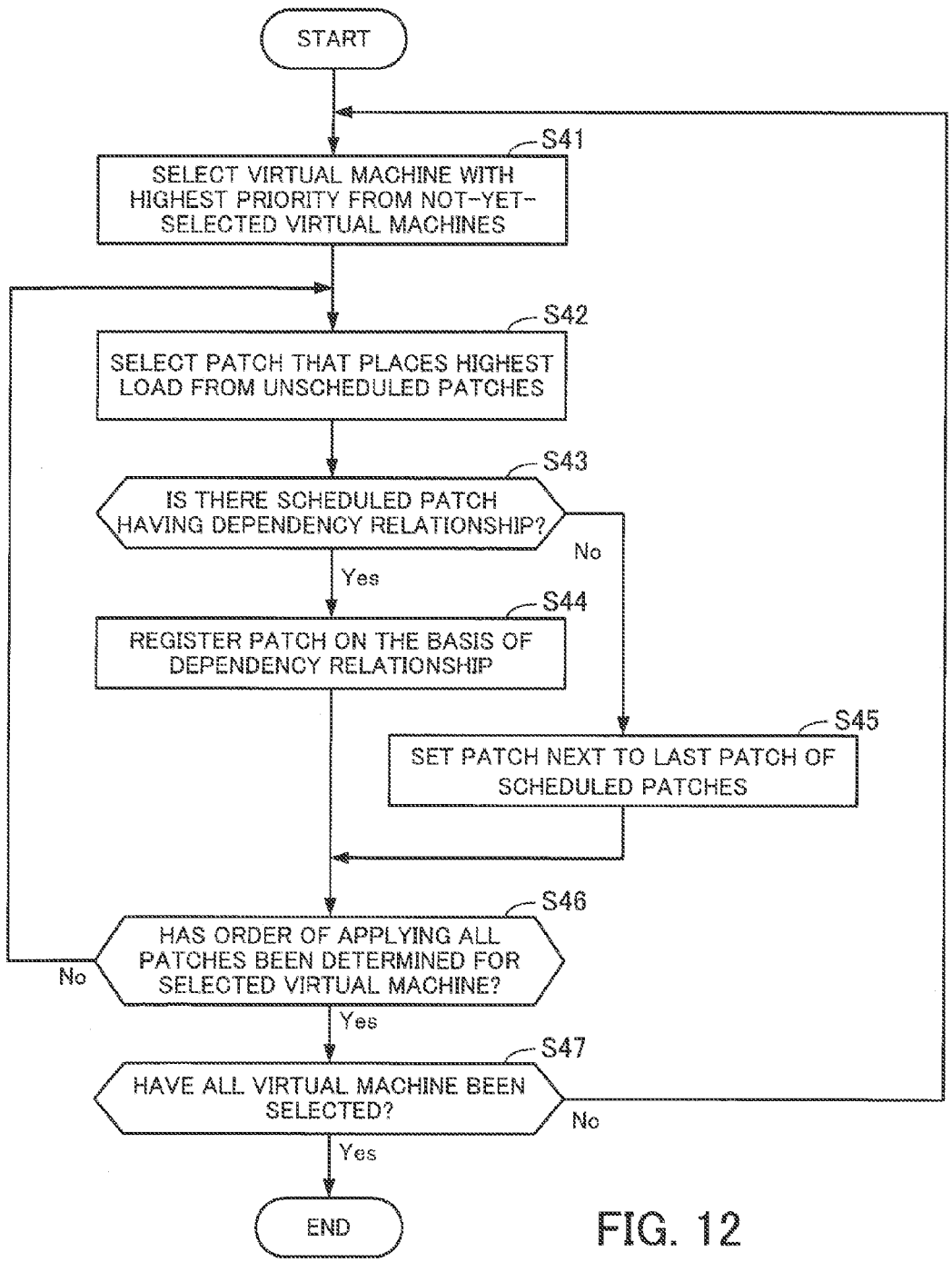
FIG. 12 is a flowchart illustrating how to set an order of applying patches according to the second embodiment.

FIG. 12 is a flowchart illustrating how to set an order of applying patches according to the second embodiment. This process will be described step by step.

(Step S41) The control unit 130 selects a virtual machine with the highest priority from the virtual machines (not-yet-selected virtual machines) that have not been subjected to steps S42 to S45, with reference to the virtual machine management table 111 stored in the storage unit 110. In this connection, the virtual machine 250 that is not to be patched is excluded from being selected at step S41.

(Step 342) The control unit 130 selects a patch that places the highest load from the patches which are to be applied to the virtual machine selected at step S41 and which have not been scheduled, with reference to the patch management table 112 stored in the storage unit 110. In this connection, patches that are to be applied to the virtual machine are already identified at step S31. In addition, as the load of the virtual machine by applying a patch, the highest one of the CPU usage, memory usage, CPU usage at restart, and memory usage at restart registered with respect to the patch in the patch management table 112 is used. Referring to the patch management table 112, the patch "P-001" has the highest CPU usage of 30% out of the above four items. Therefore, the control unit 130 evaluates that the load of 30% is of the virtual machine by the patch "P-001". On the other hand, the patch "P-003" has the highest CPU usage at restart of "40%" out of the above four items. Therefore, the control unit 130 evaluates that the load of 40% is of the virtual, machine by the patch "P-003".

(Step S43) The control unit 130 determines whether there is a scheduled patch having a dependency relationship with the patch selected at step S42. If there is such a patch, the process proceeds to step S44. Otherwise, the process proceeds to step S45. A scheduled patch having a dependency relationship is as follows: (1) a prerequisite patch whose name is indicated in the Prerequisite Patch field of the patch management table 112 in association with the currently selected patch, and which is already registered in the schedule table of the currently selected virtual machine; or (2) a patch which is already registered in the schedule table of the currently selected virtual machine and whose prerequisite patch is the currently selected patch.

(Step S44) The control unit 130 registers the information on the currently selected patch in the schedule table on the basis of the dependency relationship between patches. For example, if a prerequisite patch as defined by (1) is detected at step S43 and therefore it is determined that there is a scheduled patch having a dependency relationship, the currently selected patch is registered in the schedule table so that the patch is to be applied next to the prerequisite patch. On the other hand, if a patch as defined by (2) is detected at step S43 and therefore it is determined that there is a scheduled patch having a dependency relationship, the currently selected patch is registered in the schedule table so that the patch is to be applied immediately before the patch as defined by (2). In this connection, insertion of the currently selected patch may put off the subsequent patches in the schedule. Assuming that the time to start to apply a first patch is fixed (for example, at 00 hour 00 minute 00 second), the control unit 130 sets a scheduled start time for application, etc. in the schedule table on the basis of the information on the execution time registered in the patch management table 112. Then, the process proceeds to step S46.

(Step S45) The control unit 130 registers the currently selected patch in the schedule table so that the currently selected patch comes next to the last of the scheduled patches. For example, if the first to third patches are registered in the schedule table, the currently selected patch is set as the fourth patch. The control unit 130 sets a scheduled start time for application, etc. in the schedule table on the basis of the information on the execution times registered in the patch management table 112.

(Step S46) The control unit 130 determines whether the order of application has been determined for all patches applicable to the virtual machine selected at step S41. If the order of application has been determined for all patches, the process proceeds to step S47. Otherwise, the process proceeds back to step S42. For example, if all of the applicable patches are already registered in the schedule table of the virtual machine selected at step S41, the determination of this step is affirmative. If any applicable patch is not registered in the schedule table of the virtual machine selected at step S41, the determination of this step is negative.

(Step S47) The control unit 130 determines whether all virtual machines which are to be patched have been subjected to steps S41 to S46 or not. If all virtual machines have been subjected to these steps, the process is completed. Otherwise, the process proceeds back to step S41. For example, if schedule tables have been generated for all virtual machines which are to be patched through steps S41 to S46, the determination of this step is affirmative. If there is any virtual machine for which a schedule table needs to be generated, the determination of this step is negative.

As described above, the control unit 130 generates a schedule table for each virtual machine. The following describes a specific example of setting an order of applying patches.

FIGS. 13A, 13B, and 13C each illustrate an example of setting an order of applying patches according to the second embodiment. FIGS. 13A, 13B, and 13C illustrate an exemplary result in which the order applying patches to each of the virtual machines 220, 230, and 240 of the execution server 200 is set through the procedure of FIG. 12. It is now assumed that the same patches are to be applied to the virtual machines 220, 230, and 240.

FIGS. 13A, 13B, and 13C illustrate exemplary bar charts G10, G20, and G30 depicting the orders of applying patches to the virtual machines 220, 230, and 240, respectively. The horizontal and vertical axes of the bar charts G10, G20, and G20 represent time and load on the execution server 200. In addition, times T0 and T on the horizontal axis represent scheduled start and end times for applying the patches, respectively.

Since the same patches are assumed to be applied to the virtual machines 220, 230, and 240, the bar charts G10, G20, and G30 are the same.

The bar chart G10 includes bar sets G11, G14, G15, and G16 and bars G12 and G13. A bar set is a set of bars that correspond to the individual patches of a group having a dependency relationship (hereinafter, this group may be referred to as a patch group).

For example, the bar set G11 corresponds to a patch group including three patches with patch names, "P-001", "P-002", and "P-003", and includes 3 bars. The patch management table 112 indicates that these three patches have a dependency relationship, and it is recommended to apply the patches in the order of "P-001", "P-002", and "P-003". Therefore, the three bars of the bar set G11 are arranged in the order of "P-001", "P-002", and "P-003" from the side closer to time T0.

On the other hand, the bars G12 and G13 correspond to patches that do not have dependency relationships with any other patches. In the following description, like patches corresponding to the bars G12 and G13, patches that do not have dependency relationships with any other patches may be grouped as a patch group. For example, patches that do not have dependency relationships with any other patches may be considered as a group of patches having one feature.

The bar chart G20 includes bar sets G21, G24, G25, and G26, and bars G22 and G23. The bar chart G30 includes bar sets G31, G34, G35, and G36, and bars G32 and G33. The bar sets G21 and G31 correspond to the same patch group as the bar set G11. The bars G22 and G32 correspond to the same patch as the bar G12. The bars G23 and G33 correspond to the same patch as the bar G13. The bar sets G24 and G34 correspond to the same patch group as the bar set G14. The bar sets G25 and G35 correspond to the same patch group as the bar set G15. The bar sets G26 and G36 correspond to the same patch group as the bar set G16.

If the patches are applied according to the generated schedule tables, the execution server 200 may be overloaded. Therefore, the control unit 130 adjusts the schedule tables. The following describes the process performed at step S33 of FIG. 11 for adjusting the order of applying patches.

Figure 14:
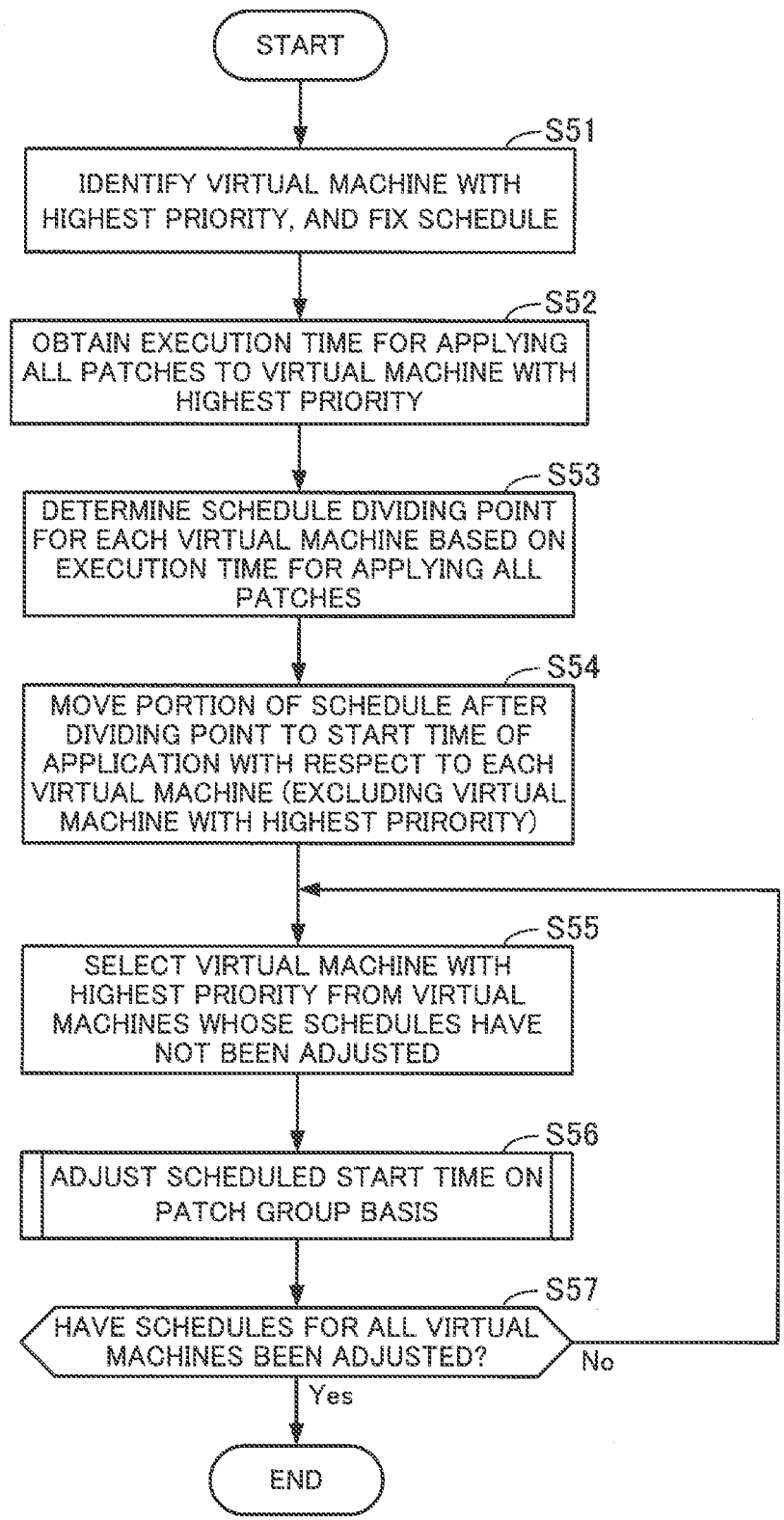
FIG. 14 is a flowchart illustrating how to adjust an order of applying patches according to the second embodiment.

FIG. 14 is a flowchart illustrating how to adjust an order of applying patches according to the second embodiment. This process will be described step by step.

(Step S51) The control unit 130 identifies the virtual machine 220 with the highest propriety with reference to the virtual machine management table 111. The control unit 130 fixes the schedule set in the schedule table 113 of the virtual machine 220. That is, the contents of the schedule table 113 will not be changed thereafter.

(Step S52) The control unit 130 obtains an execution time for applying all patches set in the schedule table 113 to the virtual machine 220 with the highest priority. The execution time is a time from time T0 to time T.

(Step S53) The control unit 130 determines a schedule dividing point for each virtual machine (the virtual machine 220 with the highest priority excluded) based on the execution time obtained at step S52. The schedule dividing point, indicates a time point in the schedule for replacing a portion of the schedule for applying patches after the time point (possibly including a plurality of schedule portions for a plurality of patch groups) with another portion of the schedule for applying patches before the time point.

(Step S54) With respect to each virtual machine, the control unit 130 moves a first portion of the schedule after the schedule dividing point to the start time of the application, so that a second portion of the schedule before the schedule dividing point moves to immediately after the first portion of the schedule. The control unit 130 moves patches on a patch group basis. This is because, if patches belonging to a patch group are not moved all together, the order of application based on the dependency relationship will be spoilt. In this connection, the control unit 130 executes this step for the virtual machines other than the virtual machine 220 with the highest priority.

(Step S55) The control unit 130 selects a virtual machine with the highest priority from the virtual machines whose schedules have not been adjusted. The virtual machines whose schedules have not been adjusted are virtual machines that have not been subjected to step S56.

(Step S56) The control unit 130 evaluates the load of the execution server 200 by applying each patch to the virtual machine selected at step S55, and adjusts the scheduled start time on a patch group basis, based on the evaluation result. This step will be described in detail later.

(Step S57) The control unit 130 determines whether the schedules for all virtual machines have been adjusted not. If the schedules for all virtual machines have been adjusted, the process is completed. Otherwise, the process proceeds back to step S55.

The following describes a specific example of schedule rearrangement based on a schedule dividing point at steps S53 and S54.

Figure 15A:
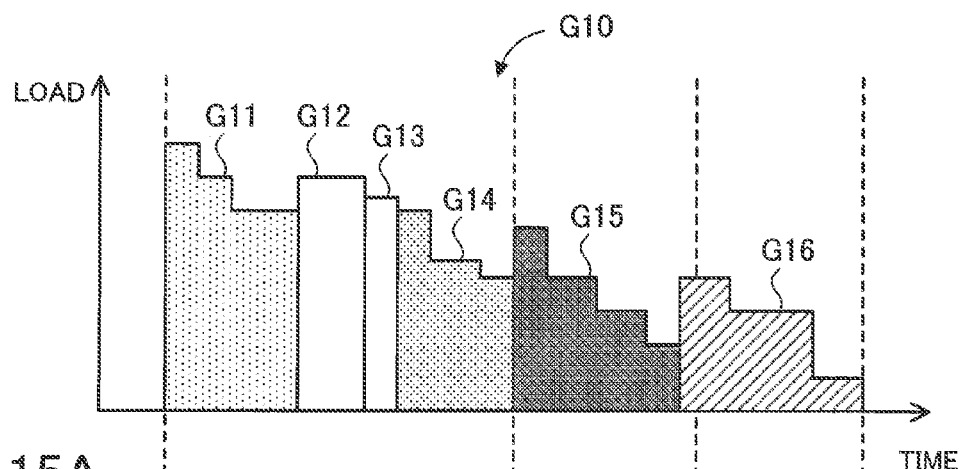
FIGS. 15A, 15B, 15C, 16A, 16B, and 16C illustrate an example of schedule rearrangement according to the second embodiment.
Figure 15B:
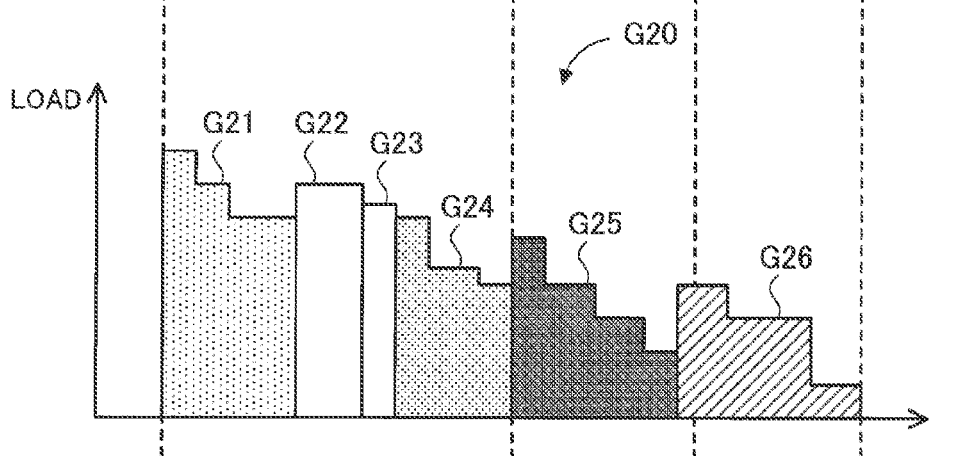
Figure 15C:
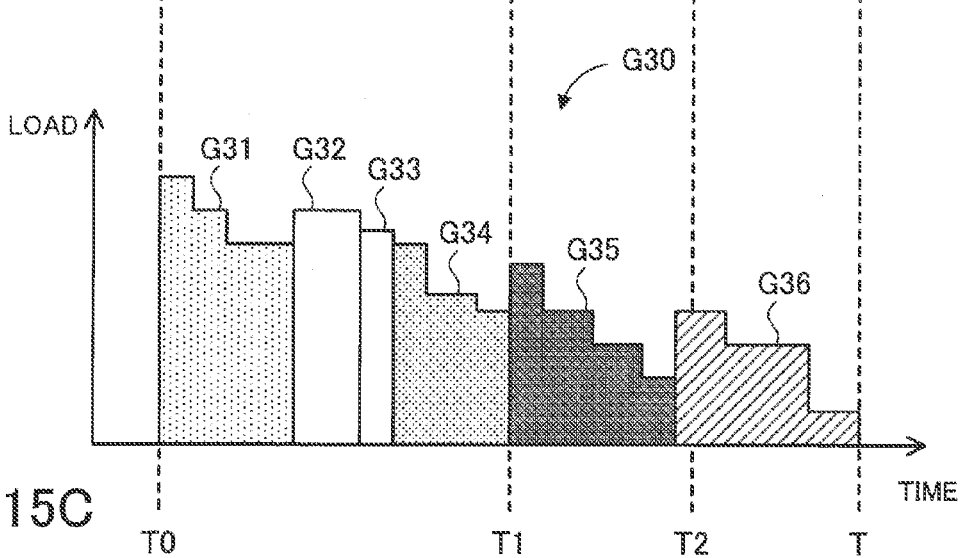

FIGS. 15A, 15B, and 15C illustrate an example of schedule rearrangement according to the second embodiment. FIGS. 15A, 15B, and 15C illustrate an exemplary method for determining schedule dividing points for the schedules of the virtual machines 220, 230, and 240 exemplified in FIGS. 13A, 13B, and 13C.

FIGS. 15A, 15B, and 15C illustrate exemplary bar charts G10, G20, and G30 depicting the orders of applying patches to the virtual machines 220, 230, and 240, respectively. The bar charts G10, G20, and G30 have been described with reference to FIGS. 13A, 13B, and 13C.

In the bar charts G10, G20, and G30, times T1 and T2 are indicated, as schedule dividing points. The time T1 is an intermediate time between times T0 and T. That is, the time interval between times T0 and T1 is equal to that between times T1 and T. The time T2 is an intermediate time between times T1 and T. That is, the time interval between times T1 and T2 is equal to the time interval between times T2 and T.

As described above, in the case where two virtual machines which are to be patched, other than the virtual machine with the highest priority, for example, two schedule dividing points (times T1 and T2) are determined. A schedule dividing point closer to time T is applied to a virtual machine with a higher priority. In this example, time T2 is set as a schedule dividing point for the virtual machine 230, whereas time T1 is set as a schedule dividing point for the virtual machine 240 because the virtual machine 230 has a higher priority than the virtual machine 240.

There may be a case where three or more virtual machines may be patched, other than the virtual machine with the highest priority. If there are three other virtual machines, for example, an intermediate time between time T2 and T is further obtained as a schedule dividing point (third schedule dividing point). Similarly, an intermediate time between the time of the third schedule dividing point and the time T is obtained as a fourth schedule dividing point. After that, schedule dividing points are obtained in the same way.

Figure 16A:
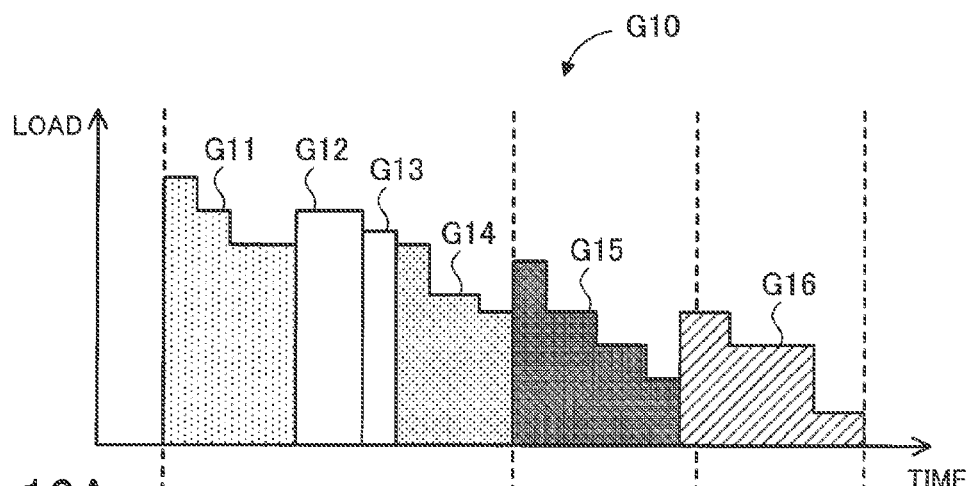
Figure 16B:
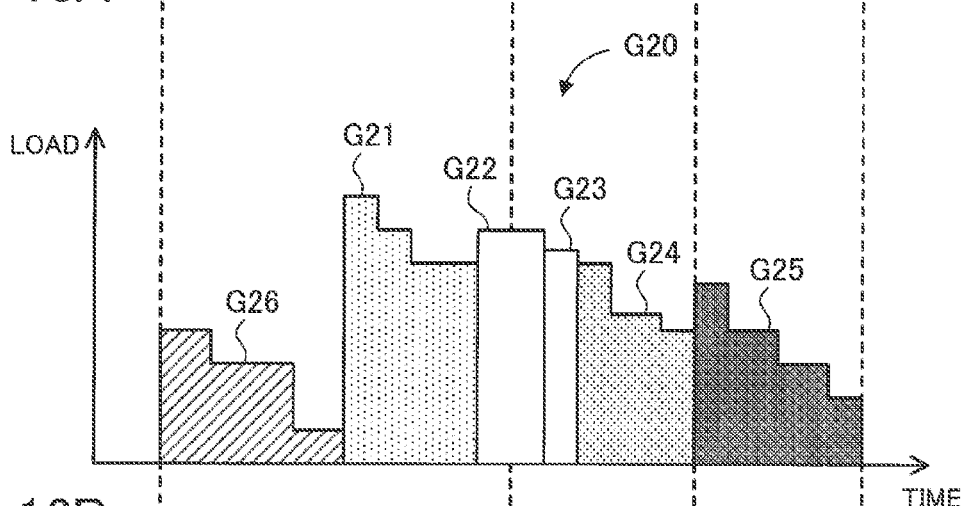
Figure 16C:
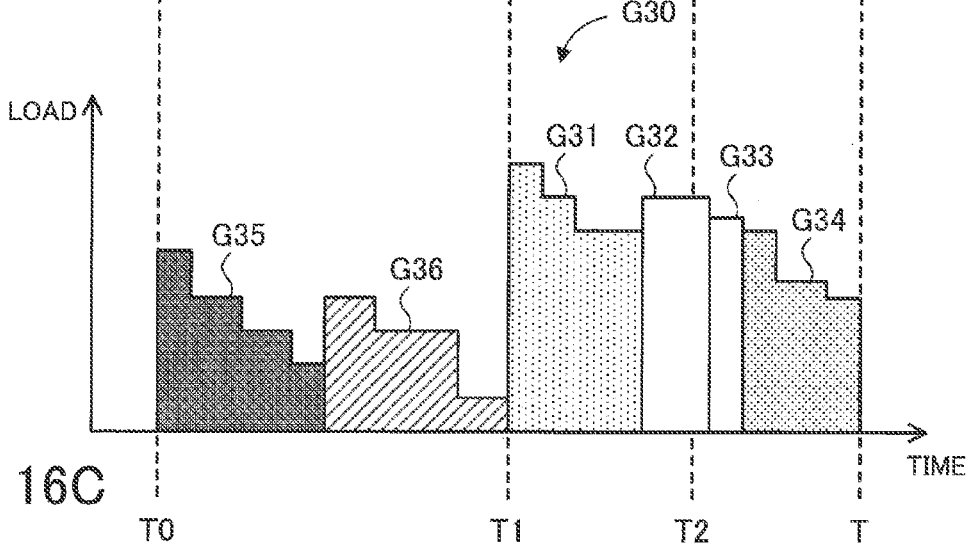

FIGS. 16A, 16B, and 16C illustrate the continued example of schedule rearrangement according to the second embodiment. FIGS. 16B and 16C illustrate exemplary schedules generated by rearranging the schedules of the virtual machines 230 and 240 based on schedule dividing points illustrated in FIGS. 15B and 15C. FIG. 15A illustrates an exemplary bar chart G10 depicting a schedule of the virtual machine 220 with the highest priority. This schedule of the virtual machine 220 is fixed. FIGS. 16B and 16C illustrate exemplary bar charts G20 and G30 after schedule rearrangement.

For example, referring to the bar chart G20, the scheduled start time to apply a patch group corresponding to the bar set G26 is moved to time T0. This is because the scheduled application time for this patch group includes time T2, which is a schedule dividing point. The scheduled start times of the other patch groups are sequentially moved to later time points so that these patch groups are to be sequentially applied immediately after the patch group corresponding to the bar set G26 is applied. In this way, with respect to patch groups after the patch group whose scheduled application time includes the time of a schedule dividing point, their scheduled start times are moved to later time points.

In addition, referring to the bar chart G30, the scheduled start time to apply a patch group corresponding to the bar set G35 is moved to time T0. In addition, the scheduled start time to apply a patch group corresponding to the bar set G36 is moved so that the patch group is to be applied immediately after the patch group corresponding to the bar set G35 is applied. The scheduled start times of the other patch groups are moved to later time points so that these patch groups are to be sequentially applied immediately after the patch group corresponding to the bar set G36 is applied.

The reason why the schedule is adjusted in order of patches having dependency relationships and with keeping continuity of the patches (on a patch group basis) in this way is as follows. As explained with reference to FIG. 14, this is for keeping the order of applying patches having dependency relationships (so as not to reverse the order) when the whole schedule is divided at predetermined dividing points and the order of applying patches is changed.

Figure 13:
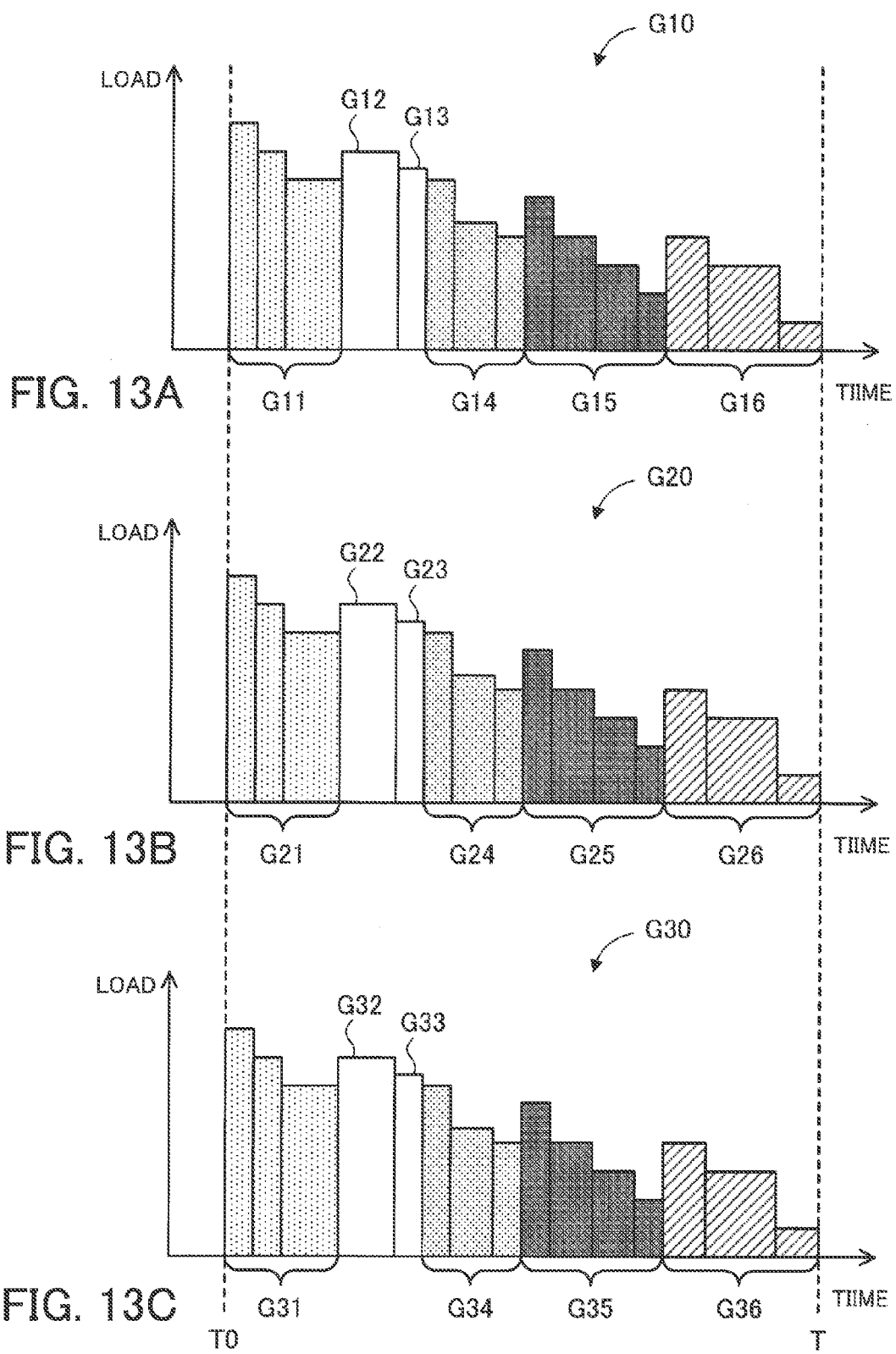
FIGS. 13A, 13B, and 13C each illustrate an example of setting an order of applying patches according to the second embodiment.

In addition, the reason why dividing points are set at the latter portion of a whole schedule to adjust the schedule is as follows. Referring to FIG. 13, an order of application is determined so that patches placing relatively high load are applied first. Therefore, in the whole schedule, patches placing relatively low load are very likely scheduled at the latter portion of the schedule. Therefore, at the time of rearranging patch groups, moving a patch group set at the latter portion of the schedule to the first half at the schedule has a lower possibility that the load of the execution server 200 exceeds the threshold. This reduces the number of times the schedule is rearranged so that load does not exceed the threshold. For example, compared with the case of rearranging patch groups randomly, this technique reduces the number of operations to determine an order of application.

The following describes a process of adjusting scheduled start times on a patch group basis at step S56 of FIG. 14.

Figure 17:
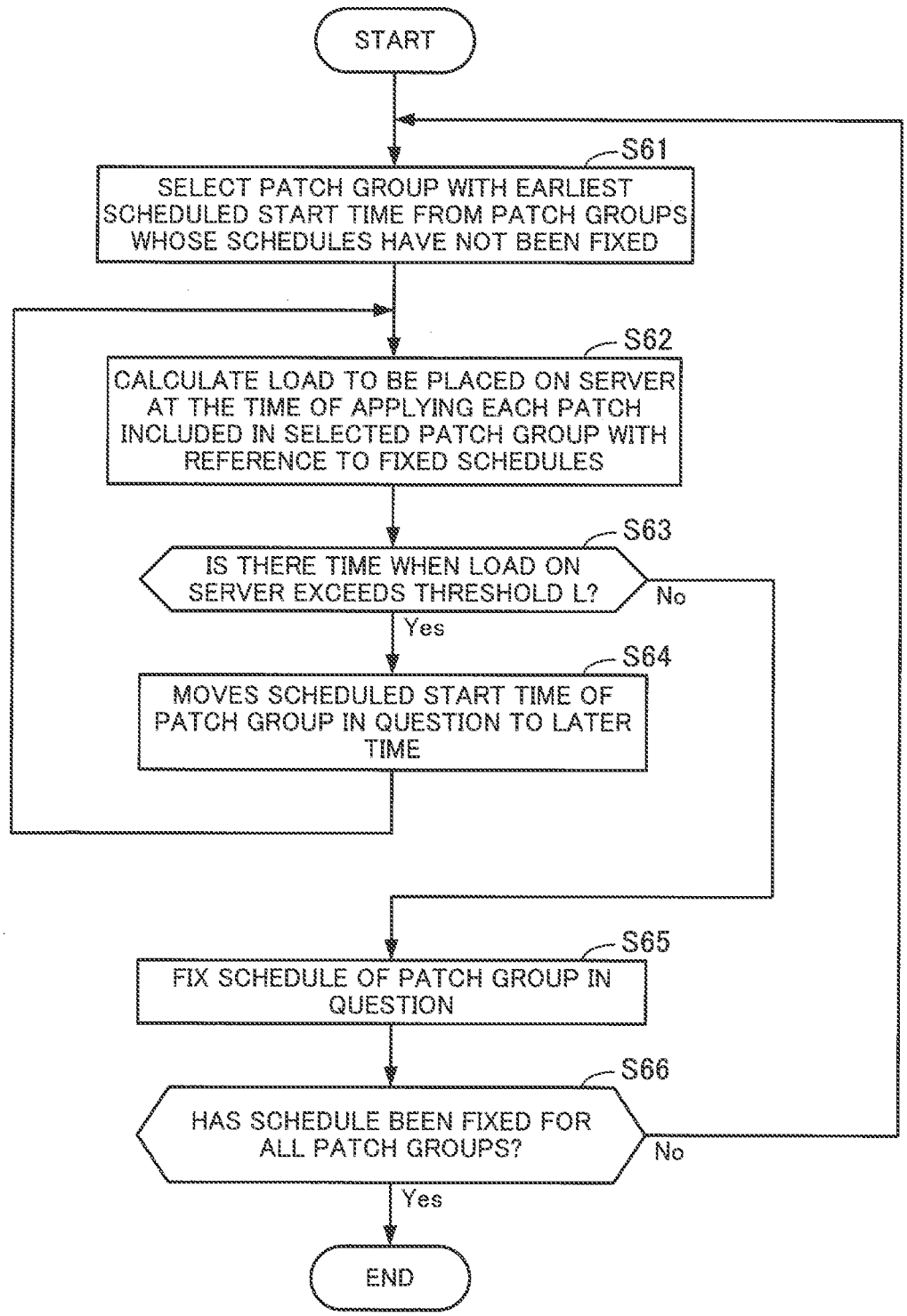
FIG. 17 is a flowchart illustrating how to adjust patch groups according to the second embodiment.

FIG. 17 is a flowchart illustrating how to adjust patch groups according to the second embodiment. This process of FIG. 17 will be described step by step.

(Step S61) The control unit 130 selects a patch group which has the earliest scheduled start time from patch groups whose schedules have not been fixed, with reference to the schedule table of a currently selected virtual machine.

(Step S62) The control unit 130 calculates the load of the execution server 200 at the time of applying each patch included in the selected patch group, with reference to the fixed schedules of the respective virtual machines (the total load of applying patches in parallel at the time of applying each patch). The control unit 130 able to identify patches to be applied to the other virtual machines within the same time period as the scheduled application time of the patch group selected at step S61, with reference to the schedule tables of the virtual machines stored in the storage unit 110. As described for step S42 of FIG. 12, as the load of applying each patch, the highest one of the CPU usage, memory usage, CPU usage at restart, and memory usage at restart registered in the patch management table 112 is used.

(Step S63) The control unit 130 determines whether or not there is a time when the load on the execution server 200 exceeds (becomes higher than) a preset threshold L. If there is such time, the process proceeds to step S64. Otherwise, the process proceeds to step S65.

(Step S64) The control unit 130 moves the scheduled start time of the currently selected patch group a later time point. For example, if the execution time for applying a patch that is first applied out of the currently selected group is t, the scheduled start time of the patch group is moved to a later time point by t. Alternatively, the control unit 130 may allow time t for movement to be set to a desired value (for example, t may be set to one minute or three minutes). Then, the process proceeds to step S62.

(Step S65) The control unit 130 fixes the schedule of the currently selected patch group. Thereby, the scheduled start time to apply each patch included in the patch group is fixed.

(Step S66) The control unit 130 determines whether the schedule has been fixed for all patch groups or not. If the schedule has been fixed for all patch groups, the process is completed. Otherwise, the process proceeds back to step S61.

As described above, the schedule of each patch group is determined so that the load of the execution server 200 does not exceed the threshold L. The control unit 130 is able to set the threshold L under various kinds of criteria. More specifically, the following first and second methods may be considered.

The first method is to determine a threshold according to the maximum assignable resources for each virtual machine. For example, as indicated in the virtual machine management table 111, the maximum resource assignment is previously predetermined for each virtual machine. In this case, the threshold L is calculated by subtracting "the total percentage of the maximum assignable resources for virtual machines which are not to be patched" from "the percentage of the assignable resources of the execution server 200". For example, "the percentage of the assignable resources of the execution server 200" is defined as 100%. On the other hand, "virtual machines which are not to be patched" is the virtual machine 250 in this example. Therefore, "the total percentage of the maximum assignable resources for virtual machines which are not to be patched" is 50%. Therefore, the threshold L is calculated as 100%−50%=50%.

The second method is to determine a threshold according to resources currently assigned to each virtual machine. In this case, the threshold L is calculated by subtracting "the total percentage of resources currently assigned to virtual machines which are not to be patched" from "the percentage of the assignable resources of the execution server 200". For example, "the percentage of the assignable resources of the execution server 200" is defined as 100%. On the other hand, "virtual machines which are not to be patched" is the virtual machine 250 in this example. Therefore, "the total percentage of resources currently assigned to virtual machines which are not to be patched" is 30%, for example. Therefore, the threshold L is calculated as 100%−30%=70%.

The following describes a specific example for adjusting scheduled start times on a patch group basis.

Figure 18:
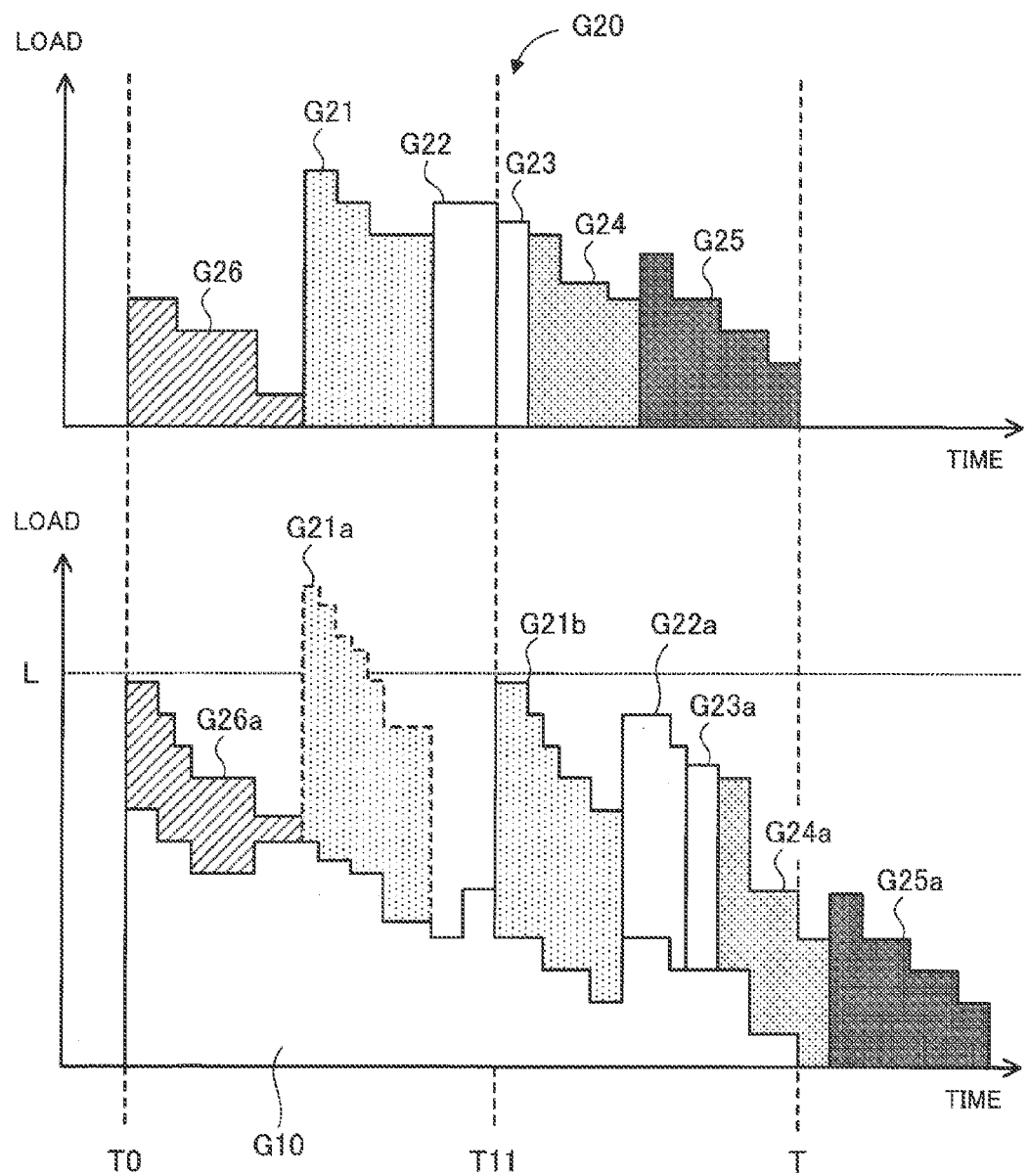
FIGS. 18 and 19 illustrate an example of adjusting patch groups according to the second embodiment.

FIG. 18 illustrates an example of adjusting patch groups according to the second embodiment. FIG. 18 exemplifies the case of adjusting a schedule on a patch group basis with respect to the patches to be applied to the virtual machine 230. The schedule of the virtual machine 220 having a higher priority than the virtual machine 230 is already fixed. The schedule of the virtual machine 220 is represented by the bar chart G10. In addition, FIG. 18 also illustrates an exemplary load threshold L allowable for the execution server 200.

First, the control unit 130 stacks the bar set G26 on the bar chart G10 (calculates the total load for each time period). The scheduled start time to apply the first patch group corresponding to the bar set G26 is set to time T0, through the process exemplified in FIGS. 16A, 16B, and 16C. The bar set G26a is obtained by stacking the bar set G26 on the bar chart G10. It is recognized from the result of the stacking that the load of the execution server 200 does not exceed the threshold L while the first patch group is applied. Therefore, the control unit 130 fixes this time period for applying the first patch group in the schedule.

Then, the control unit 130 stacks the bar set G21 on the bar chart G10. The scheduled start time to apply the second patch group corresponding to the bar set G21 is set to a time immediately after the first patch group is applied, through the process exemplified in FIGS. 16A, 16B, and 16C. The bar set G21a is obtained by stacking the bar set G21 on the bar chart G10. In this case, it is recognized from the result of this stacking that there is a time when the load on the execution server 200 exceeds the threshold L while the second patch group is applied. Therefore, the control unit 130 moves the schedule for applying the second patch group to a later time point, and repeats the same determination. In this way, the schedule is adjusted so that the load on the execution server 200 does not exceed the threshold L. For example, by moving the scheduled start time to apply the second patch group to time T11, it becomes possible to apply each patch so that the load on the execution server 200 does not exceed the threshold L. The bar set G21b is obtained by moving the scheduled start time for the application to time T11 and stacking the bar set G21 on the bar chart G10.

Now, consider the case where time T11 is later than the scheduled start time to apply a patch (patch P) to the virtual machine 220 and earlier than the scheduled end time of the patch P. In this case, the scheduled start time T11 to apply the patch group corresponding to the bar set G21b may be moved up to the scheduled start time to apply the patch P, and it may be confirmed whether the load of the execution server 200 exceeds the threshold L or not. In the case where the load does not exceed the threshold L even if time T11 is moved up to the scheduled start time to apply the patch P, time T11 may be fixed so as to match the scheduled start time to apply the patch P. Moving up the scheduled start time T11 to apply the patch group corresponding to the bar set G21b for the virtual machine 220 shortens the schedule.

The control unit 130 determines the scheduled start times to apply the other patch groups in the same manner. The bar G22a is obtained by stacking the bar G22 on the bar chart G10. The bar G23a is obtained by stacking the bar G23 on the bar chart G10. The bar set G24a is obtained by stacking the bar set G24 on the bar chart G10. The bar set G25a is obtained by stacking the bar set G25 on the bar chart G10.

Figure 19:
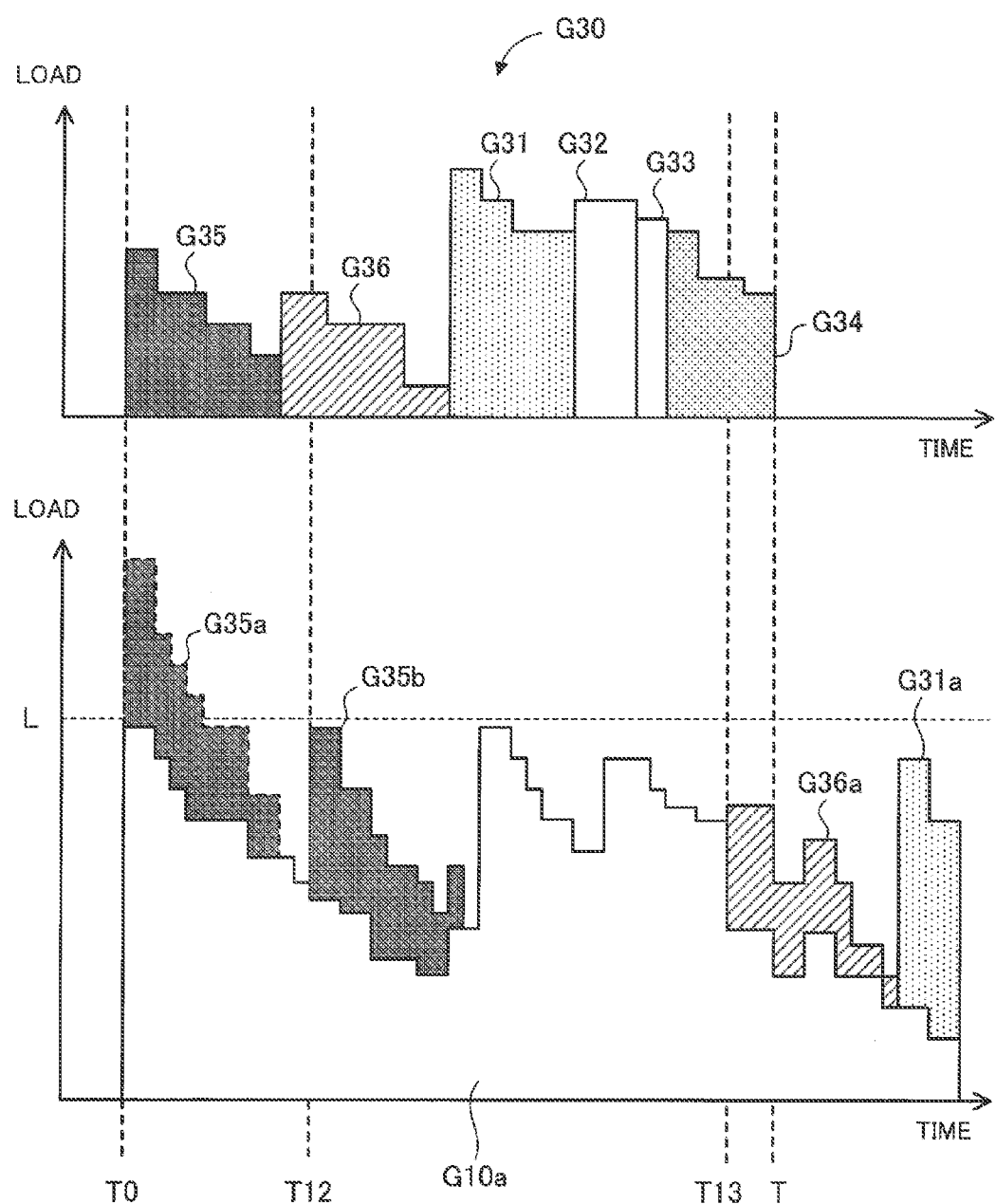

FIG. 19 is the continued example of adjusting patch groups according to the second embodiment. FIG. 19 exemplifies the case of adjusting a schedule on a patch group basis with respect to patches to be applied to the virtual machine 240. The schedules of the virtual machines 220 and 230 having higher priorities than the virtual machine 240 are already fixed. These fixed schedules are represented by the bar chart G10a. In addition, FIG. 19 illustrates the load threshold L allowable for the execution server 200.

First, the control unit 130 stacks the bar set G35 on the bar chart G10a. The scheduled start time to apply the third patch group corresponding to the bar set G35 is set to time T0 through the process exemplified in the FIGS. 16A, 16B, and 16C. The bar set G35a is obtained by stacking the bar set G35 on the bar chart G10a. In this case, it is recognized from the result of this stacking that there is a time when the load of the execution server 200 exceeds the threshold L while the third patch group is applied. Therefore, the control unit 130 moves the schedule for applying the third patch group to a later time point, and repeats the same determination. In this way, the schedule is adjusted so that the load on the execution server 200 does not exceed the threshold L. For example, by moving the scheduled start time to apply the third patch group to time T12, it becomes possible to apply each patch so that the load on the execution server 200 does not exceed the threshold L. The bar set G35b is obtained by moving the scheduled start time for the application to time T12 and stacking the bar set G35 on the bar chart G10a.

The control unit 130 determines the scheduled start times to apply the other patch groups in the same manner. The bar G36a is obtained by moving a scheduled start time to apply the corresponding patch group to time T13, and stacking the bar set G36 on the bar chart G10a. The bar G31a is obtained by stacking the bar set G31 on the bar chart G10a (partially). The bars obtained by stacking the bars G32 and G33 and bar set G34 on the bar chart G10a are not illustrated.

Figure 20:
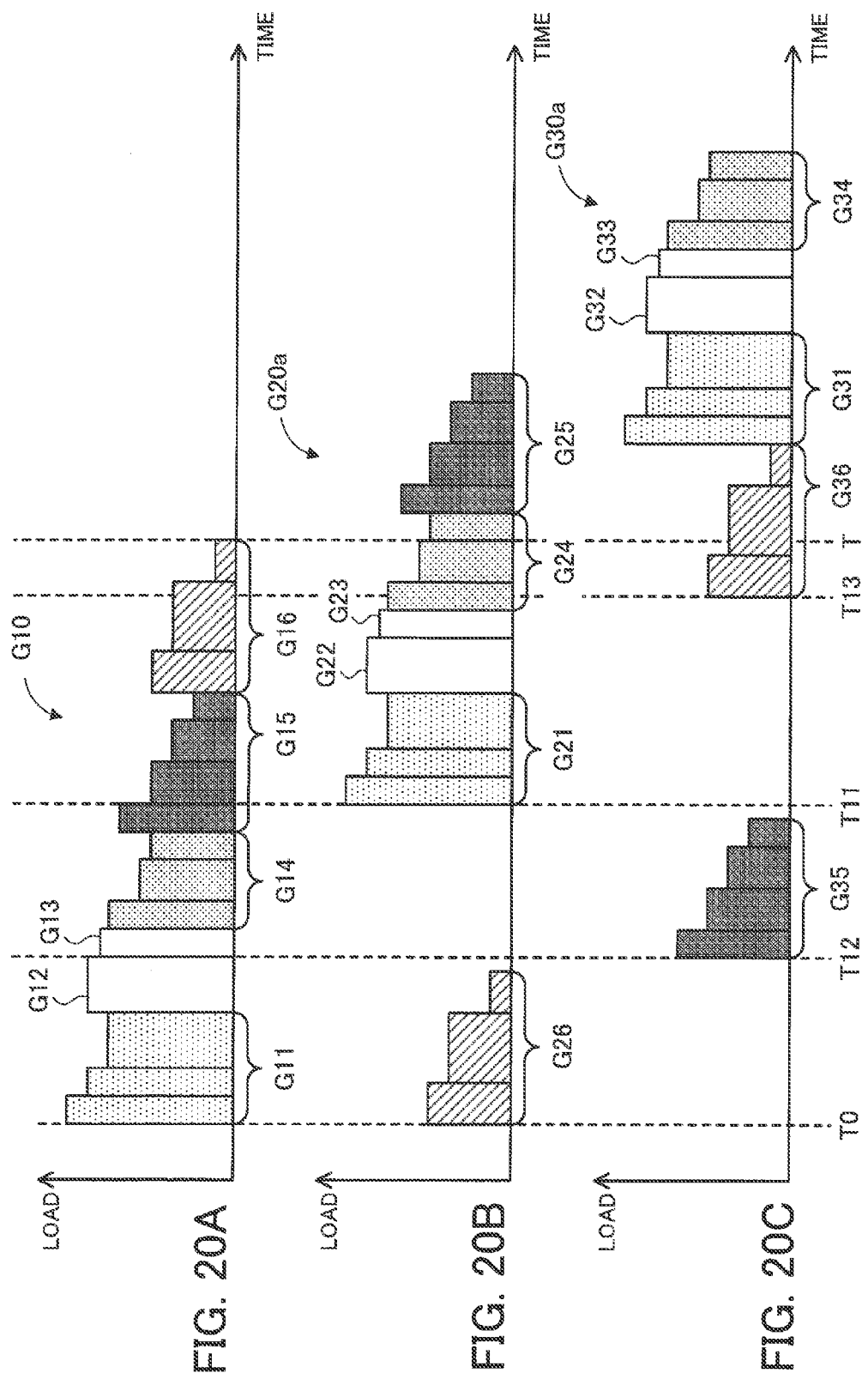
FIGS. 20A, 20B, and 20C illustrate an example fixed schedules according to the second embodiment.

FIGS. 20A, 20B, and 20C illustrate an example of fixed schedules according to the second embodiment. FIGS. 20A, 20B, and 20C illustrate bar charts G10, G20a, and G30a depicting schedules fixed for the virtual machines 220, 230, and 240, respectively. The horizontal axes and vertical axes of the bar charts G10, G20a, and G30a represent time and load on the execution server 200, respectively. The bar graph G10 is the same as that explained with reference to FIG. 13A.

The bar chart G20a depicts an exemplary schedule fixed for the virtual machine 230 as a result of the process described with reference to FIG. 18. The patch group corresponding to the bar set G26 starts to be applied at time T0. The patch group corresponding to the bar set G21 starts to be applied at time T11. The other subsequent patch groups are to be sequentially applied thereafter.

The bar chart G30a depicts an exemplary schedule fixed for the virtual machine 240 as a result of the process described with reference to FIG. 19. The patch group corresponding to the bar set G35 starts to be applied at time T12. The patch group corresponding to the bar set G36 starts to be applied at time T13. The other subsequent patch groups are to be sequentially applied thereafter.

As described above, the schedules for applying patches are adjusted so that the load on the execution sever 200 does not exceed the threshold L. This reduces the effect of the load of the execution server 200 by applying patches. For example, a threshold L of 50% allows the remaining 50% resources to be available while patches are applied. This enables the virtual machines 220, 230, and 240 (or virtual machines other than these) to use the remaining resources to perform other processing tasks. As described above, the threshold L is determined according to resources that need to be secured for other processing tasks. This makes it possible to support to apply patches to the virtual machines 220, 230, and 240 promptly while securing prescribed resources.

By the way, the patch application may not progress as scheduled. If this happens, the control unit 130 modifies the schedule according to the actual progress of the patch application. The following describes how to modify a schedule at step S14 of FIG. 9.

Figure 21:
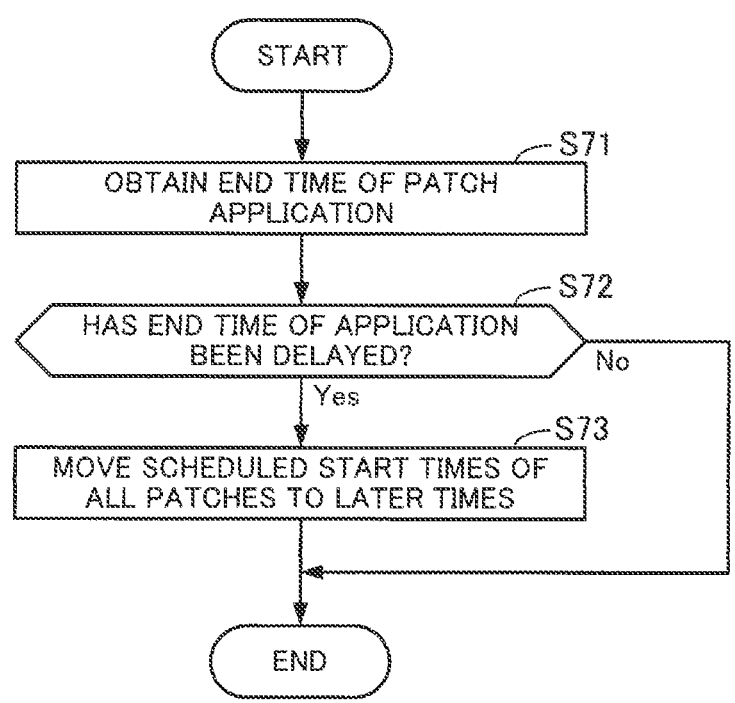
FIG. 21 is a flowchart illustrating an example of how to modify a schedule according to the second embodiment.

FIG. 21 is a flowchart illustrating an example of how to modify a schedule according to the second embodiment. This process of FIG. 21 will be described step by step.

(Step S71) When the application of any patch for a virtual machine is completed, the execution unit 210 provides the control unit 130 with information indicating the virtual machine, the patch, and the end time of the application. The control unit 130 then registers the end time of the application of the patch in the schedule table of the virtual machine.

(Step S72) The control unit 130 determines whether a delay has occurred, based on the end time of the application reported at step S71 with reference to the schedule table. If a delay has occurred, the process proceeds to step S73. If no delay has occurred, the process is completed.

(Step S73) The control unit 130 moves the scheduled start times of all patches to be applied to the virtual machines 220, 230, and 240, to time points later than the current scheduled start times. For example, the control unit 130 may move each of the scheduled start times to a later time point by the delay time.

As described above, the control unit 130 further modifies the schedule based on the actual progress while applying patches. This is because the execution times taken to apply individual patches may not match the execution times evaluated by the evaluation server 300. If a delay occurs by actually applying a patch, the control unit 130 delays the scheduled start times to apply the other patches by for example, the delay time. Otherwise, patches that place the load exceeding the threshold L may be applied in combination to the virtual machines.

Further, the second embodiment exemplifies the case where one patch is scheduled to be applied to one virtual machine at any time. However, if a conflict of patch application does not cause any problems, two or more patches may be scheduled to be applied to one virtual machine at some time point. For example, patches "P-001" and "P-004" may be scheduled to be applied to the virtual machine 220 in parallel at some time point. In this case, the load of the virtual machine 220 is evaluated by calculating the total load of applying these patches. For example, the upper limit for the number or applicable patches to the same virtual machine in parallel may be set to two, three, or another in advance. Then, scheduling may be performed in the same manner as described in the second embodiment so that more patches may preferentially be applied to a virtual machine having a higher priority in parallel, and the load on the execution server 200 does not exceed the threshold L.

As described earlier, the information processing of the first embodiment may be implemented by the operation unit 1b executing a program. In addition, the information processing of the second embodiment may be implemented by the processor 101 executing a program. Such a program may be recorded on a computer-readable recording medium (for example, optical disc 13, memory device 14, memory card 16, etc.).

To distribute the program, portable recording media, on which the program is recorded, may be put on sale. Alternatively, the program may be stored in the storage device of another computer and may be transferred from the other computer to other computers over a network. A computer which is to execute the above program stores in its local storage device the program recorded on a portable recording medium or transferred from the other computer, for example. Then, the computer reads the program from the local storage device, and runs the program. The computer may run the program directly from the portable recording medium. Also, while receiving the program being transferred from the other computer, the computer may directly run this program.

In addition, the above-described information processing may also be implemented wholly or partly by using DSP, ASIC, PLD, or other electronic circuits.

According to one embodiment, it is possible to efficiently determine a schedule for applying update programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a scheduling program to execute a process comprising:

building a respective evaluation virtual machine corresponding to a respective virtual machine of a plurality of virtual machines executed in an information processing apparatus, wherein each built evaluation virtual machines contains the same performance level as its associated virtual machine;

for each respective update program of a plurality of update programs, obtaining a projected load information indicating the load of the virtual machine after applying the respective update program to the associated each evaluation virtual machine, wherein said load information includes at least one of processor load or memory load;

determining, for each individual virtual machine of the plurality of virtual machines, respective order of applying the plurality of different update programs to the individual virtual machine within a predetermined time period based on the obtained projected load information of the associated evaluation virtual machine compared to an upper load limit allowable for updating all virtual machines of the information processing apparatus;

based on the determining, creating an overall order for applying the plurality of updates wherein the overall order creates a sequence of update program combinations to be applied in parallel for different respective virtual machines of the information processing apparatus wherein the load of each combination to be applied in parallel is lower than or equal to the upper load limit, and prohibiting any combination of the update programs from being applied in parallel when the load of the information processing apparatus, exceeds the upper load limit;

based on the created overall order, changing for each individual virtual machine, the order for applying the plurality of different update programs to the individual virtual machine;

sending the different combinations of update programs in the overall order to each of the plurality of virtual machines;

applying in parallel, the sent combination of update programs, to their respective virtual machines.

2. The non-transitory computer-readable storage medium according to claim 1, wherein:

the information processing apparatus includes one or more virtual machines to which the update programs are to be applied and one or more virtual machines to which no update programs are to be applied, and resource usage of resources of the information processing apparatus used for applying the update programs is obtained as the load of the information processing apparatus; and the upper load limit is determined based on information on assignment of resources to the one or more virtual machines to which no update programs are to be applied.

3. The non-transitory computer-readable storage medium according to claim 2, wherein the upper load limit is determined based on a sum of maximum assignable resources for the one or more virtual machines to which no update programs are to be applied.

4. The non-transitory computer-readable storage medium according to claim 2, wherein the upper load limit is determined based on a sum of resources currently assigned to the one or more virtual machines to which no update programs are to be applied.

5. An information processing apparatus comprising:
a memory configured to store load information indicating the load of a virtual machine; and
a processor configured to perform a process including:
building a respective evaluation virtual machine corresponding to a respective virtual machine of a plurality of virtual machines executed in another information processing apparatus, wherein each built evaluation virtual machines contains the same performance level as its associated virtual machine;
for each respective update program of a plurality of update programs, obtaining, from the memory, a projected load information indicating the load of the virtual machine after applying the respective update program to the associated each evaluation virtual machine, wherein said load information includes at least one of processor load or memory load;
determining, for each individual virtual machine of the plurality of virtual machines, a respective order of applying the plurality of different update programs to the individual virtual machine within a predetermined time period based on the obtained projected load information of the associated evaluation virtual machine compared to an upper load limit allowable for updating all virtual machines of said another information processing apparatus;
based on the determining, creating an overall order for applying the plurality of updates wherein the overall order creates a sequence of update program combinations to be applied in parallel for different respective virtual machines of said another information processing apparatus, wherein the load of each combination to be applied in parallel is lower than or equal to the upper load limit, and prohibiting any combination of the update programs from being applied in parallel when the load of said another information processing apparatus, exceeds the upper load limit;
based on the created overall order, changing for each individual virtual machine, the order for applying the plurality of different update programs to the individual virtual machine;
sending the different combinations of update programs in the overall order to each of the plurality of virtual machines; and
applying in parallel, the sent combination of update programs, to their respective virtual machines.

6. A scheduling method executed by a computer comprising:
building, by a processor included in the computer, a respective evaluation virtual machine corresponding to a respective virtual machine of a plurality of virtual machines executed in an information processing apparatus, wherein each built evaluation virtual machines contains the same performance level as its associated virtual machine;
for each respective update program of a plurality of update programs, obtaining, by the processor, a projected load information indicating the load of the virtual machine after applying the respective update program to the associated each evaluation virtual machine, wherein said load information includes at least one of processor load or memory load;
determining, by the processor, for each individual virtual machine of the plurality of virtual machines, respective order of applying the plurality of different update programs to the individual virtual machine within a predetermined time period based on the obtained projected load information of the associated evaluation virtual machine compared to an upper load limit allowable for updating all virtual machines of the information processing apparatus;
based on the determining, creating, by the processor, an overall order for applying the plurality of updates wherein the overall order creates a sequence of update program combinations to be applied in parallel for different respective virtual machines of the information processing apparatus, wherein the load of each combination to be applied in parallel is lower than or equal to the upper load limit, and prohibiting any combination of the update programs from being applied in parallel when the load of the information processing apparatus, exceeds the upper load limit;
based on the created overall order, changing, by the processor, for each individual virtual machine, the order for applying the plurality of different update programs to the individual virtual machine;
sending, by the processor, the different combinations of update programs in the overall order to each of the plurality of virtual machines; and
applying, by the processor, in parallel, the sent combination of update programs, to their respective virtual machines.

* * * * *